United States Patent
Thompson et al.

(10) Patent No.: US 9,828,006 B2
(45) Date of Patent: *Nov. 28, 2017

(54) DISENGAGING HANDLE ASSEMBLY FOR A BOTTOM OUTLET VALVE

(71) Applicant: Union Tank Car Company, Chicago, IL (US)

(72) Inventors: Nicholas Thompson, Chicago, IL (US); Gary Walter, Chicago, IL (US)

(73) Assignee: Union Tank Car Company, Chicago, IL (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/949,486

(22) Filed: Nov. 23, 2015

(65) Prior Publication Data

US 2016/0075347 A1 Mar. 17, 2016

Related U.S. Application Data

(63) Continuation-in-part of application No. 14/213,407, filed on Mar. 14, 2014.

(60) Provisional application No. 61/791,906, filed on Mar. 15, 2013.

(51) Int. Cl.
| | |
|---|---|
| *B61D 5/00* | (2006.01) |
| *G05G 1/08* | (2006.01) |
| *G05G 1/04* | (2006.01) |
| *F16K 31/60* | (2006.01) |
| *F16B 7/04* | (2006.01) |
| *F16K 31/46* | (2006.01) |
| *F16K 35/02* | (2006.01) |
| *F16K 35/06* | (2006.01) |

(52) U.S. Cl.
CPC .............. *B61D 5/00* (2013.01); *F16B 7/0406* (2013.01); *F16K 31/46* (2013.01); *F16K 31/602* (2013.01); *F16K 35/02* (2013.01); *F16K 35/06* (2013.01); *G05G 1/08* (2013.01); *G05G 1/085* (2013.01); *G05G 1/04* (2013.01); *Y10T 74/20474* (2015.01)

(58) Field of Classification Search
CPC .......... F16K 35/06; F16K 35/02; F16K 31/44; F16K 31/46; F16K 31/60; F16K 31/602; F16B 7/0406; G05G 1/08; G05G 1/04; B61D 5/00; Y10T 74/20474
USPC ....... 251/95, 96, 98, 99, 101, 291, 292, 293; 137/377, 899
See application file for complete search history.

(56) References Cited

U.S. PATENT DOCUMENTS

| | | |
|---|---|---|
| 1,996,351 A | 4/1935 | Schultz |
| 3,010,346 A | 11/1961 | Kulp |
| 3,314,444 A | 4/1967 | White, Jr. |
| 3,827,671 A | 8/1974 | Bolden et al. |
| 3,930,634 A | 1/1976 | Loveless |
| 4,212,447 A | 7/1980 | Behle |

(Continued)

*Primary Examiner* — Kevin Murphy
*Assistant Examiner* — Kelsey Rohman
(74) *Attorney, Agent, or Firm* — Banner & Witcoff, Ltd.

(57) ABSTRACT

A handle assembly for an outlet valve for a tank, where the outlet valve has a stem that is actuated to open and close the outlet valve, is provided. The handle assembly includes a handle. A shaft is attached to the handle, and an adapter attached to the shaft. A bracket is adapted to mount the shaft to the tank so that the shaft is pivotally mounted with respect to the tank and movable with respect to the outlet valve between an engaged position, where the adapter is connected to the stem, and a disengaged position, where the adapter is disconnected from the stem.

18 Claims, 32 Drawing Sheets

(56) References Cited

U.S. PATENT DOCUMENTS

| | | | |
|---|---|---|---|
| 4,292,858 A | 10/1981 | Lipshield | |
| 6,260,932 B1 | 7/2001 | Tinklepaugh | |
| 2005/0262908 A1* | 12/2005 | Parker | B66F 13/00 70/177 |

* cited by examiner

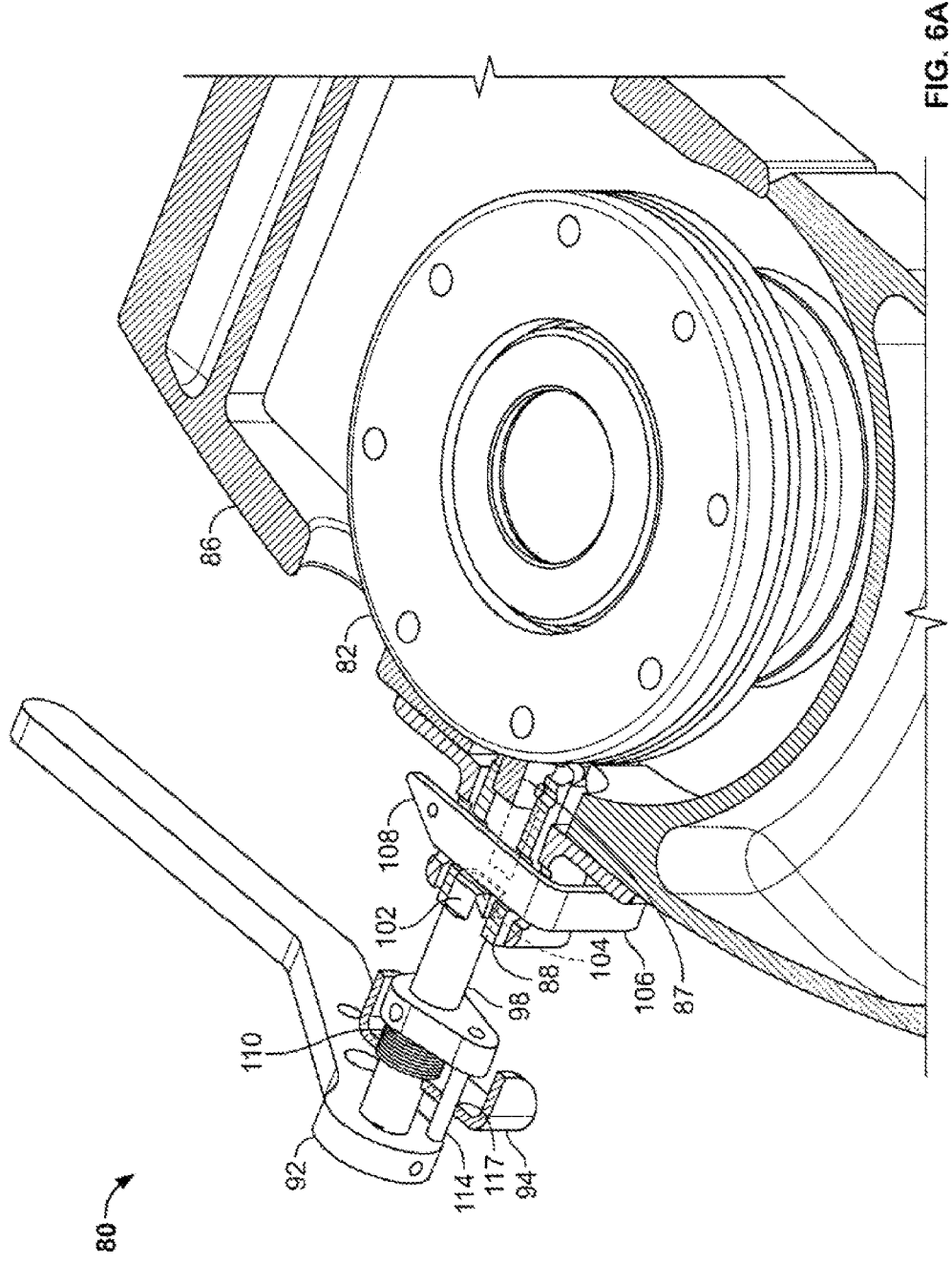

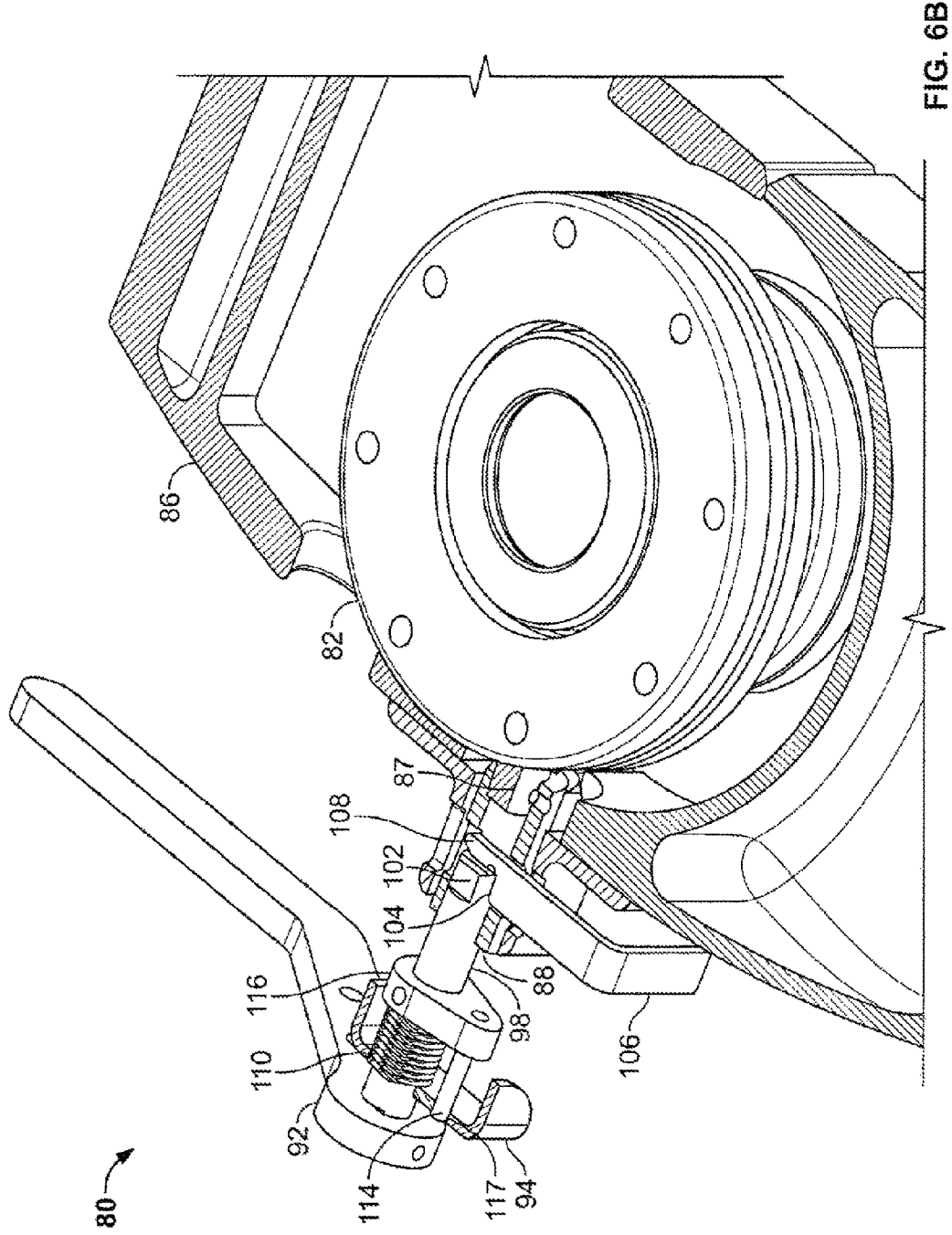

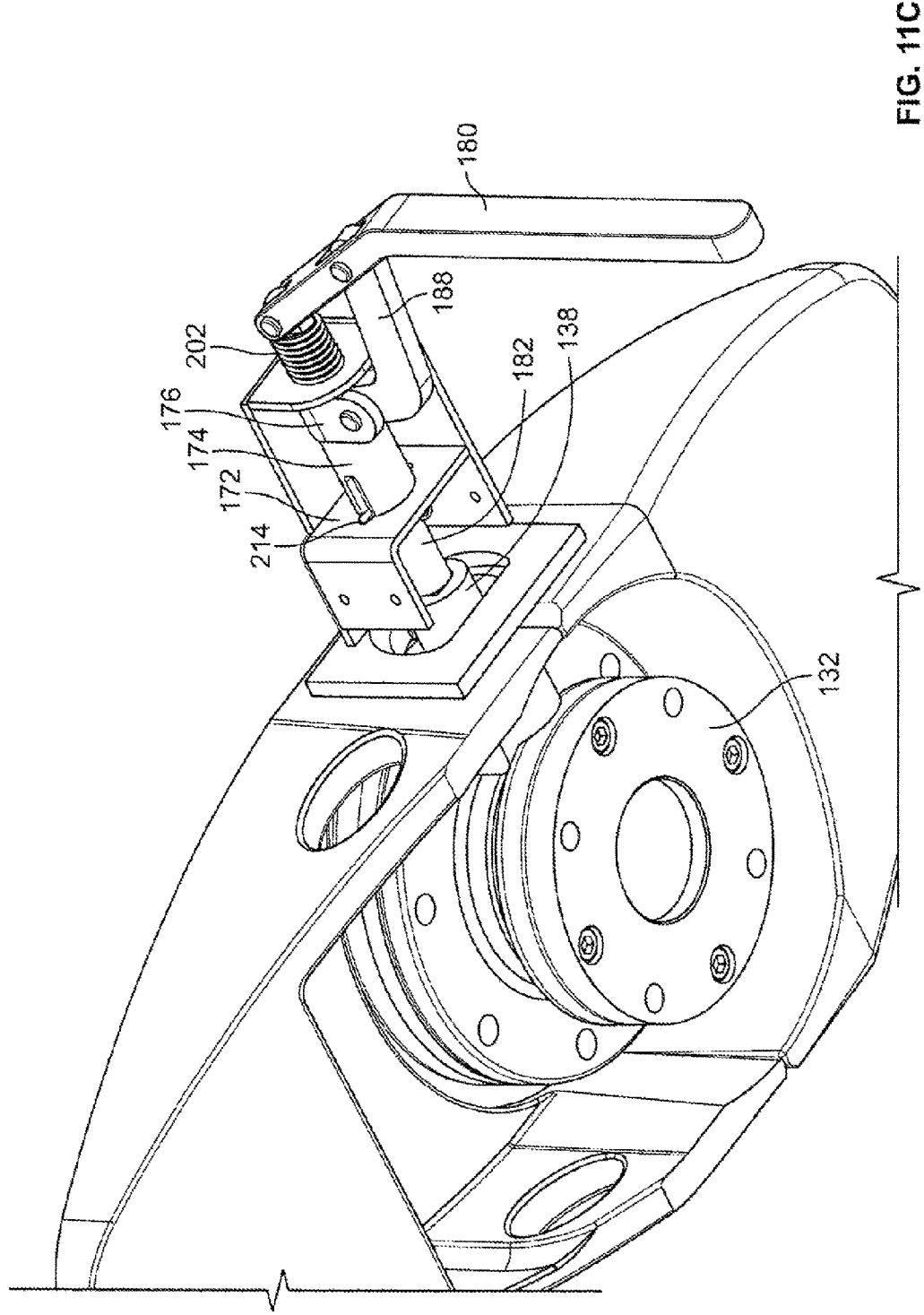

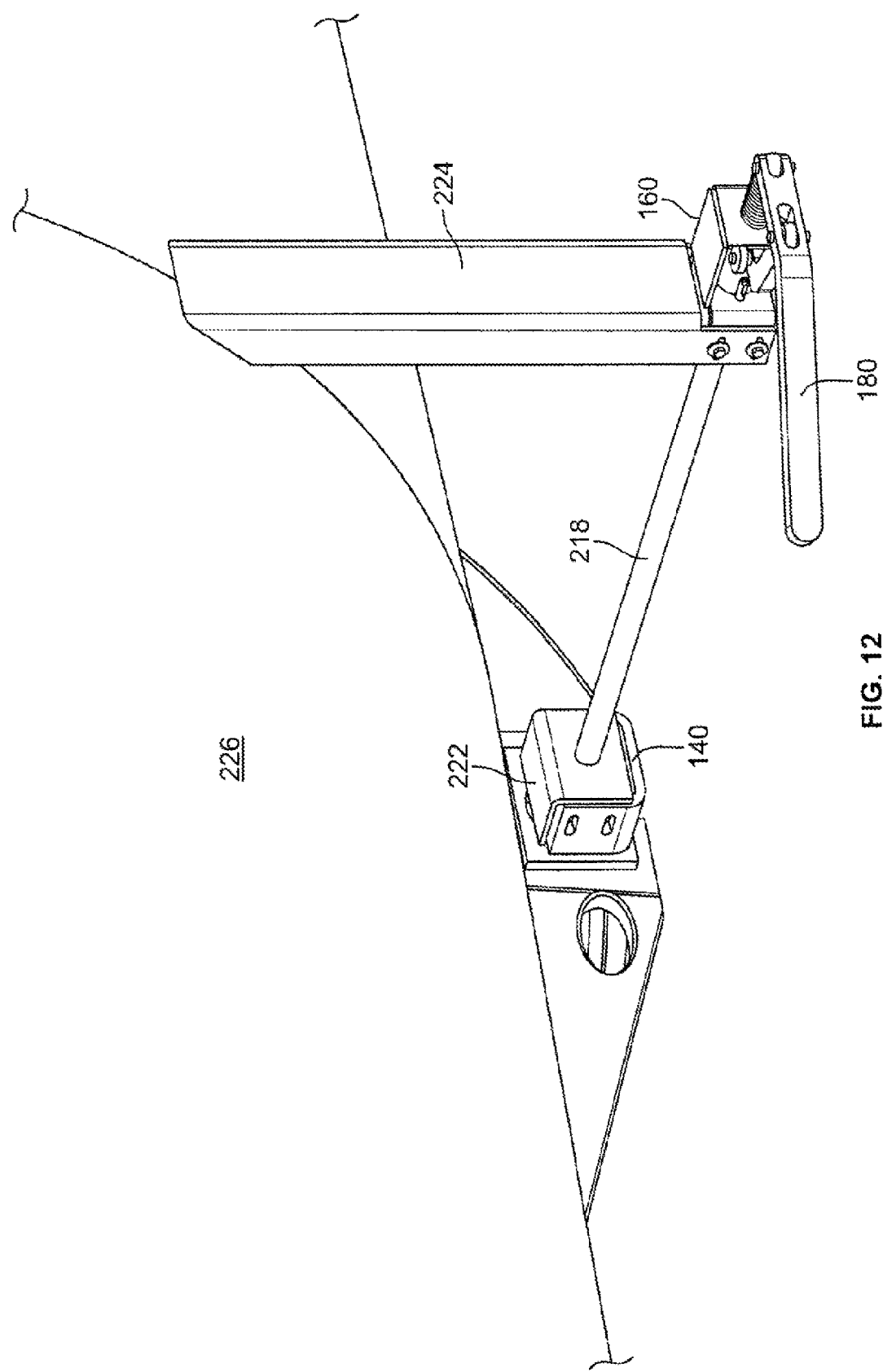

DISENGAGING HANDLE ASSEMBLY FOR A BOTTOM OUTLET VALVE

RELATED APPLICATIONS

This application is a continuation-in-part of U.S. application Ser. No. 14/213,407, filed Mar. 14, 2014, which claims the benefit of U.S. Provisional Application No. 61/791,906, filed Mar. 15, 2013.

FIELD OF THE INVENTION

The present invention relates generally to tank transport vehicles and, more specifically, to a disengaging handle assembly for the bottom outlet valve of a tank.

BACKGROUND

Railroad tank cars are often equipped with bottom outlet valves (BOVs) to permit easy offloading of the cargo being hauled in the tank car. Such BOVs are typically ball valves that are positioned on the bottom of the tank of the tank car and in communication with the interior of the tank. The BOV remains closed while the tank is being loaded and during transit. Upon arrival at the offloading location, the BOV is opened so that the cargo drains or otherwise flows out of the tank through the BOV.

Handles are usually used to open and close BOVs. Prior art designs include a variety of standard (direct) handles and remote handles that remain attached to the BOV.

Tank cars equipped with BOVs are susceptible to leaks when the BOV operating handle inadvertently operates the BOV during train movement or accidents. For example, a BOV handle could move to the open position due to vibration during transportation or forces and/or deformation generated by an accident.

A need therefore exists for a disengaging bottom outlet valve handle that eliminates the mechanical connection between the operating handle and the BOV when the BOV is not being opened or closed, preventing any force on the operating handle from inadvertently opening the BOV during train (or other vehicle) movement or accidents.

BRIEF DESCRIPTION OF THE DRAWINGS

FIGS. 6A-6D are top perspective views of the disengaging handle assembly of FIG. 5 in the disengaged, partially engaged (with BOV closed), engaged (with BOV closed) and engaged (with BOV open) configurations, respectively;

FIGS. 11A-11C are bottom perspective views of the disengaging handle assembly of FIGS. 7-10 with the mounting bracket flange and stop block omitted for clarity and illustrating the disengaging handle assembly in the disengaged, engaged (with BOV closed) and engaged (with BOV open) configurations, respectively;

FIG. 12 is a top side perspective view of a side remote-operated version of the disengaging handle assembly of FIGS. 7-11C;

DETAILED DESCRIPTION OF EMBODIMENTS

A first embodiment of the disengaging handle assembly of the invention is indicated in general at 10 in FIGS. 1-4. While the invention is described below in terms of use on a railroad tank car, it may be mounted on and used with any vehicle-mounted tank used to transport cargo.

Figure 1:
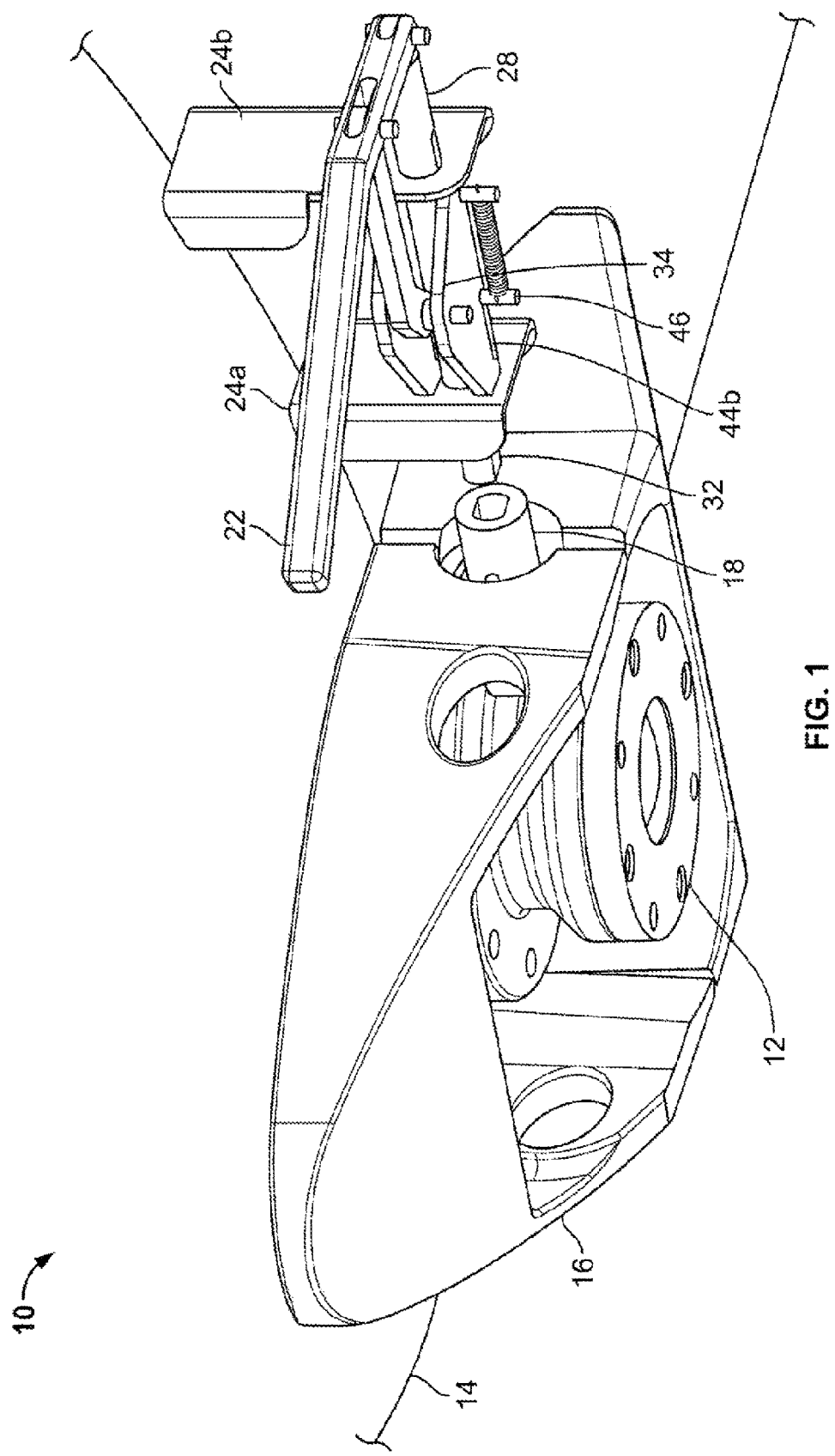
FIG. 1 is a bottom perspective view of a first embodiment of the disengaging handle assembly of the invention in a disengaged configuration.

As illustrated in FIG. 1, and as known in the art, a bottom outlet valve (BOV) 12 is attached to the bottom of the tank 14 of a railroad tank car. A skid 16 is mounted to the tank and positioned so as to surround and protect the BOV. The BOV includes a valve stem that is provided with a BOV coupler 18.

Figure 2:
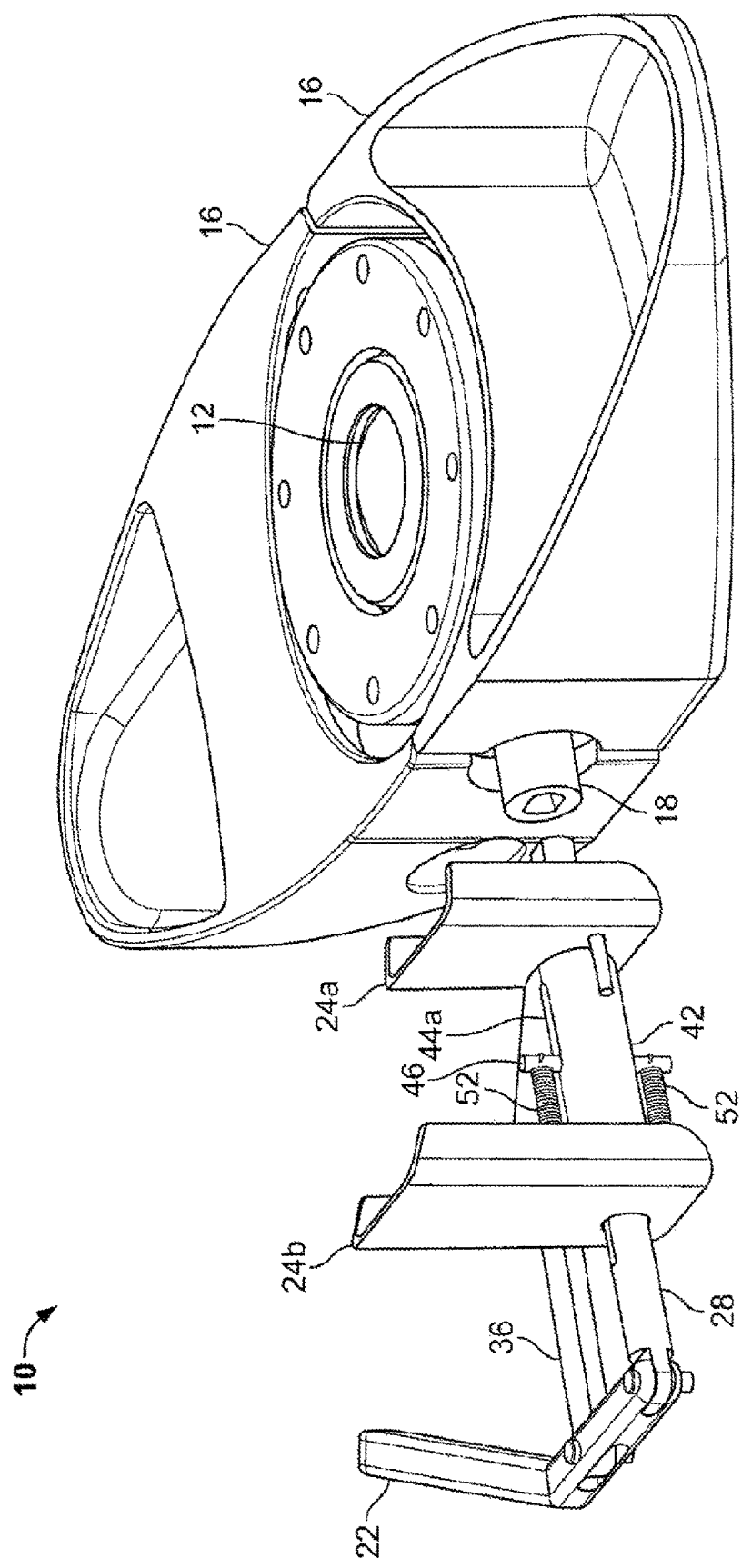
FIG. 2 is a top perspective view (with the tank omitted) of the disengaging handle assembly of FIG. 1.
Figure 3A:
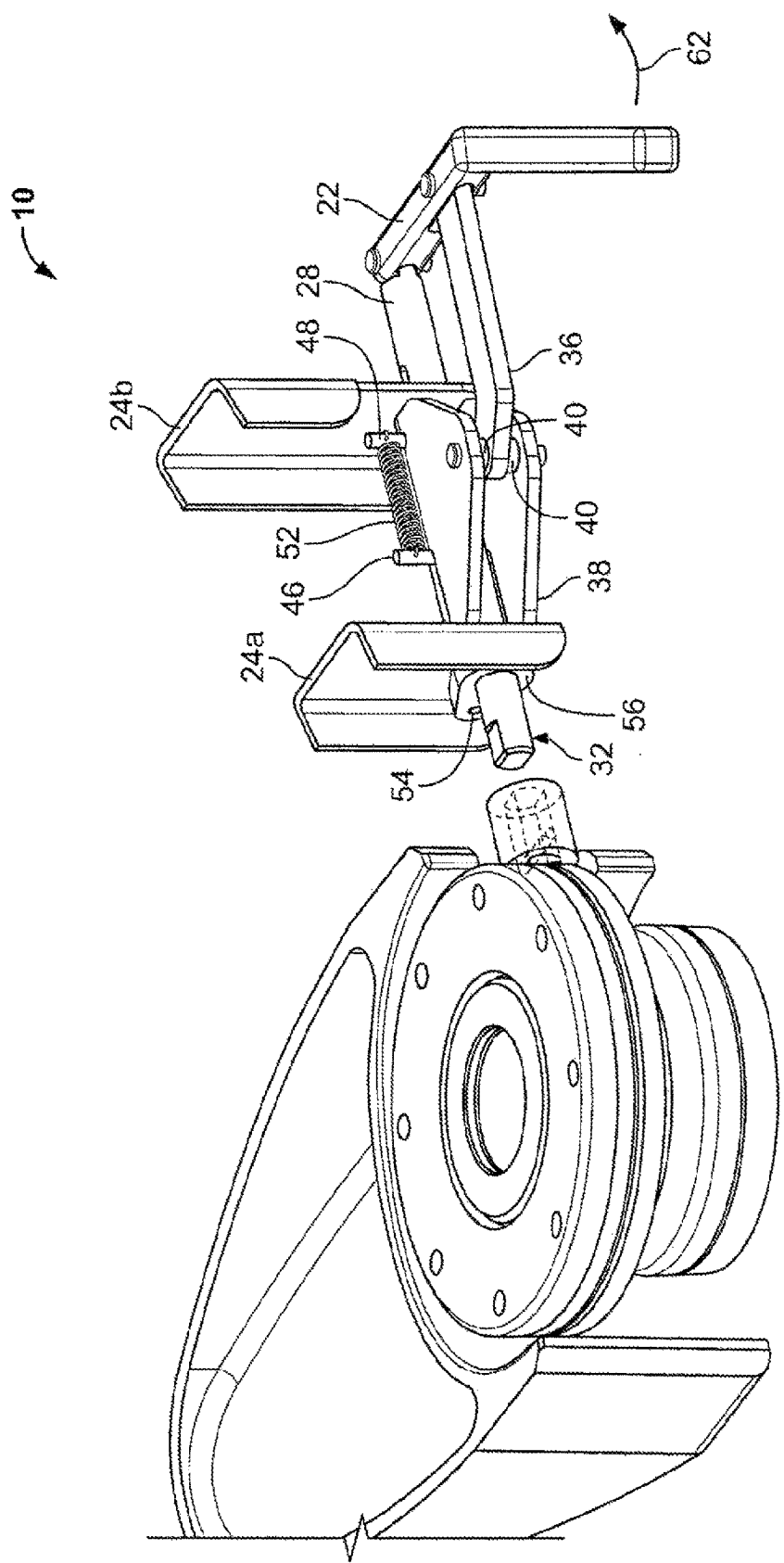
FIGS. 3A-3C are top perspective views of the disengaging handle assembly of FIGS. 1 and 2 in the disengaged, engaged (with BOV closed) and engaged (with BOV open) configurations, respectively.
Figure 3B:
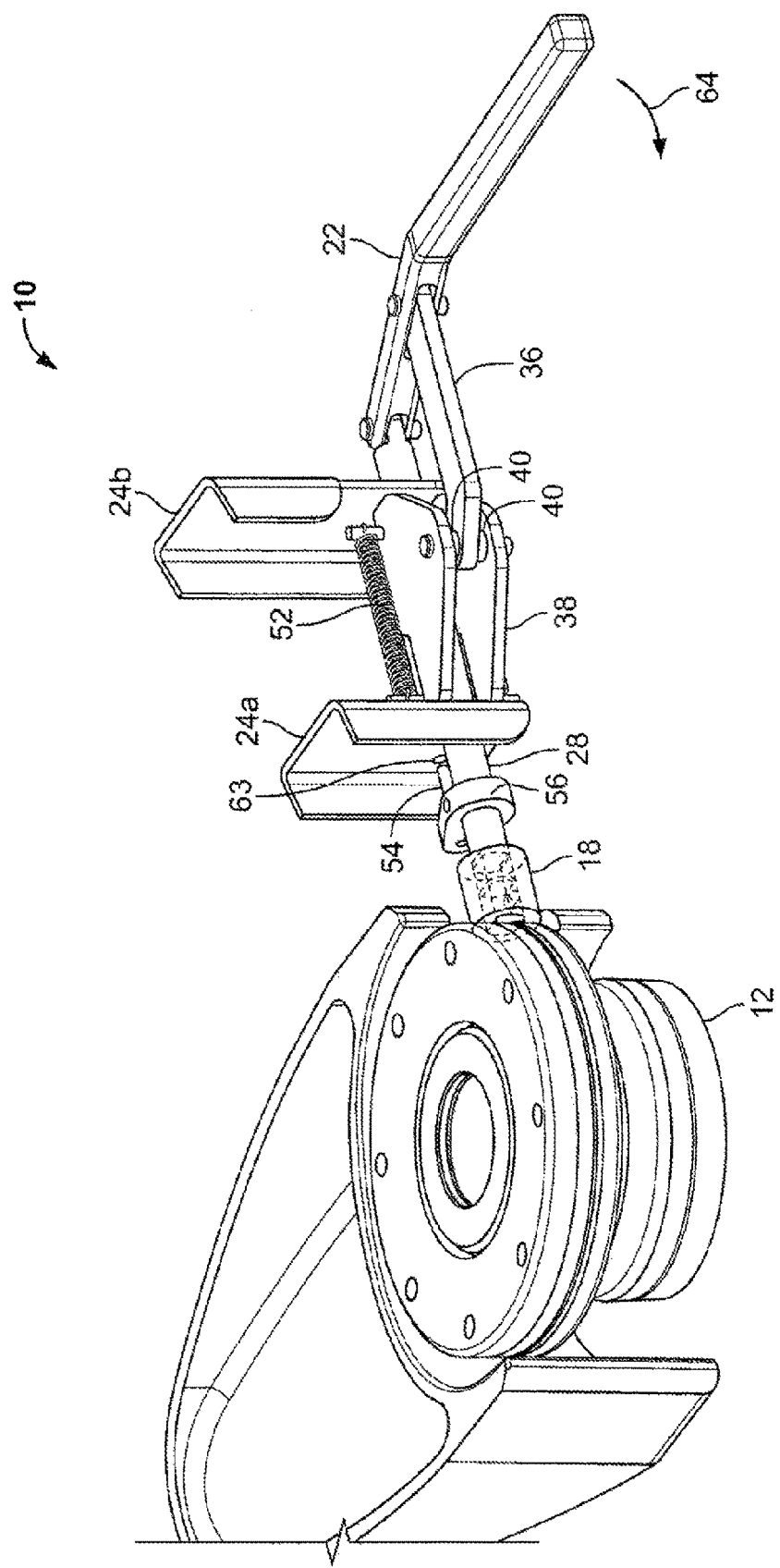

As illustrated in FIGS. 1 and 2, the first embodiment of the disengaging handle assembly 10 includes a handle 22 that is pivotally attached to the bottom of the tank by bracket members 24a and 24b. The handle 22 is pivotally attached to the distal end of a shaft 28. The proximal end of the shaft is provided with a tip 32 that is sized and shaped to removably engage the coupler 18, as explained below. A four-bar linkage 34 is built into the handle to engage and disengage the handle from the BOV, as will also be explained below. The four-bar linkage includes a proximal portion of the handle 22, a portion of the shaft 28, a link 36 and a collar 38. As illustrated in FIGS. 3A and 3B, the link 36 is pivotally attached at one end between the opposing plates of collar 38 by bushings 40 and at the other end to handle 22.

Shaft 28 pivots within and slides horizontally through brackets 24a and 24b under the control of handle 22. The collar 38 includes a U-shaped portion 42 that is positioned between brackets 24a and 24b. The U-shaped portion of the collar features a pair of slots 44a (FIG. 2) and 44b (FIG. 1). A pin 46 passes through the shaft in a fixed fashion and extends through slots 44a and 44b. As illustrated in FIG. 3A, collar 38 is also provided with a pin 48, and a pair of extension springs 52 extend between pins 46 and 48 so as to urge the disengaging handle assembly 10 into the disengaged configurations illustrated in FIGS. 1, 2 and 3A.

Figure 3C:
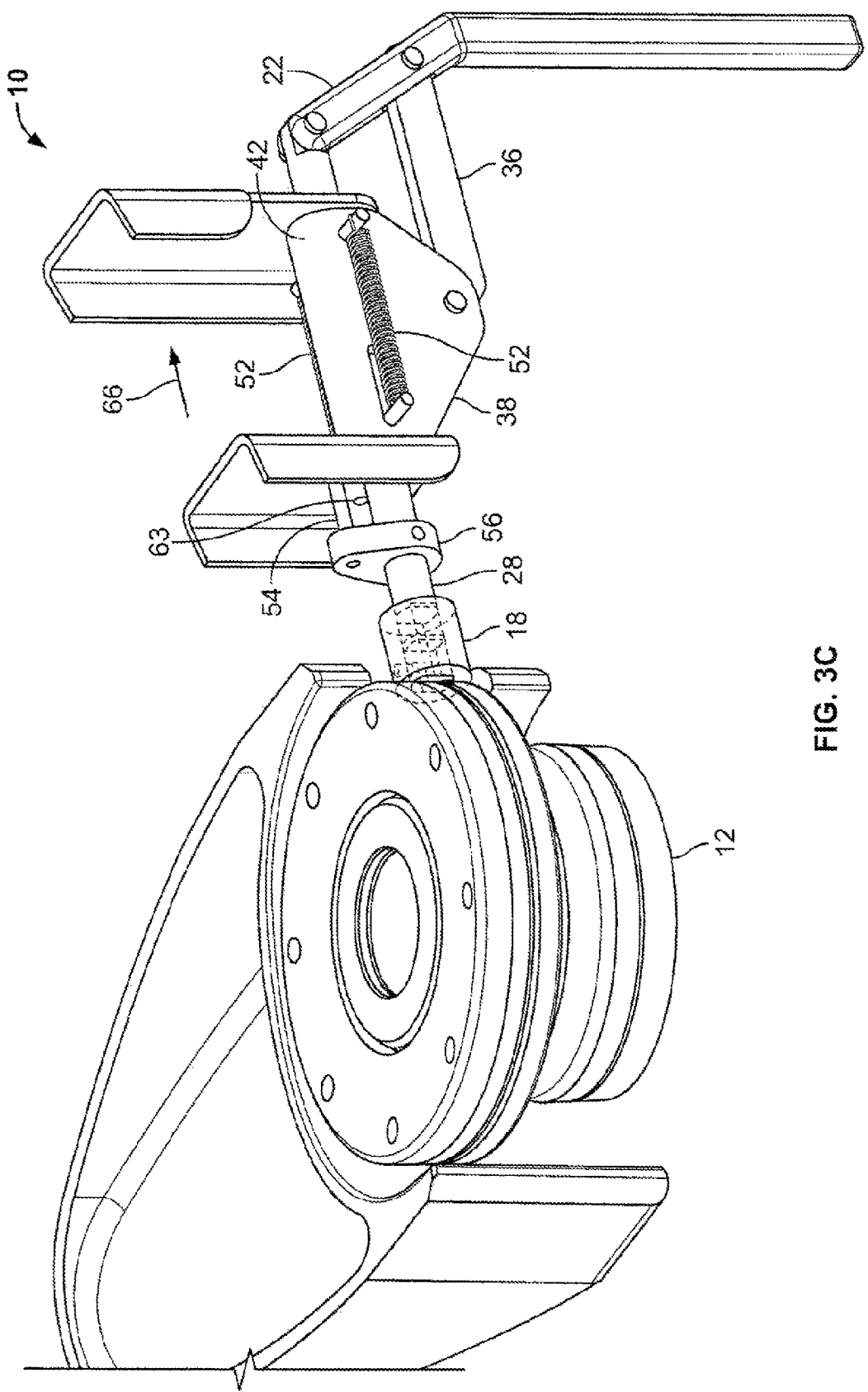

As illustrated in FIGS. 3A-3C, a locator pin 54 is attached to the shaft 28 by locator pin holder 56 so as to turn with the shaft 28.

Use of the disengaging handle assembly 10 will now be explained with regard to FIGS. 3A-3C. Starting with the disengaging handle assembly 10 in the disengaged configuration of FIG. 3A (and FIGS. 1 and 2), where the BOV is in the closed condition, the operator pulls on the handle 22, in the direction of arrow 62 of FIG. 3A, which pushes the tip 32 of the shaft into the BOV coupler 18, engaging the handle with the valve. More specifically, the handle is engaged when flats ground into the tip 32 of the shaft are inserted into a matching hole in the BOV coupler 18. As a result, the disengaging handle assembly is in the engaged configuration illustrated in FIG. 3B. The BOV is still closed at this time. In addition, as illustrated in FIG. 3B, the locator pin 54 has been removed from its corresponding hole 63 formed in the bracket 24a.

Next, the operator turns the handle generally 90° counter-clockwise, as illustrated by arrow 64 in FIG. 3B, opening the BOV. The handle is now in the position illustrated in FIG. 3C. The locator pin 54 attached to the shaft 28 ensures that the tip of the shaft of the handle assembly cannot be disengaged from the BOV coupler 18 unless the BOV is closed, preventing the operator from accidentally leaving the BOV open during train movement. More specifically, with reference to FIG. 3C, the locator pin 54 is out of alignment with the locator pin hole 63 so that the shaft is prevented from moving in the direction of arrow 66.

The locator pin 54, which is secured within the locator pin hole 63 when the handle assembly 10 is in the configuration of FIGS. 1, 2 and 3A, also prevents the handle from rotating during train movement.

The two extension springs 52 (which, as noted above, are attached between pins on the shaft and the collar) pull the handle to its default, disengaged position (FIGS. 1, 2 and 3A) once the handle 22 is pivoted back into the position of FIG. 3B, the locator pin 54 is aligned with its hole 63 on the mounting bracket and the BOV is closed.

Figure 4:
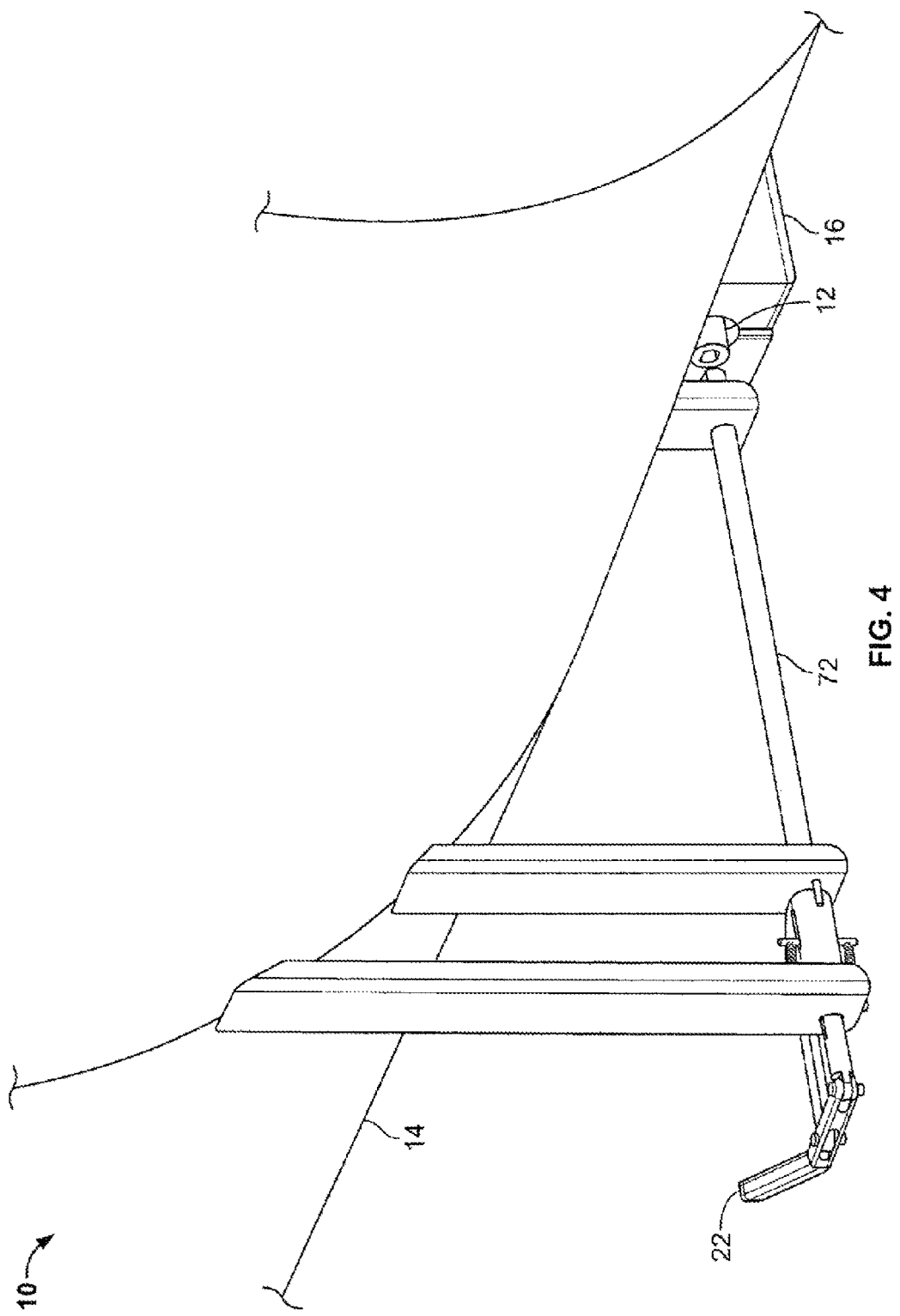
FIG. 4 is a top side perspective view of a side remote-operated version of the disengaging handle assembly of FIGS. 1-3C.

As illustrated in FIG. 4, the embodiment of FIGS. 1-3C can be converted to a remote-operated handle by providing the disengaging handle assembly 10 with an extended shaft 72 so that the handle is accessible from the side of the tank car.

Figure 5:
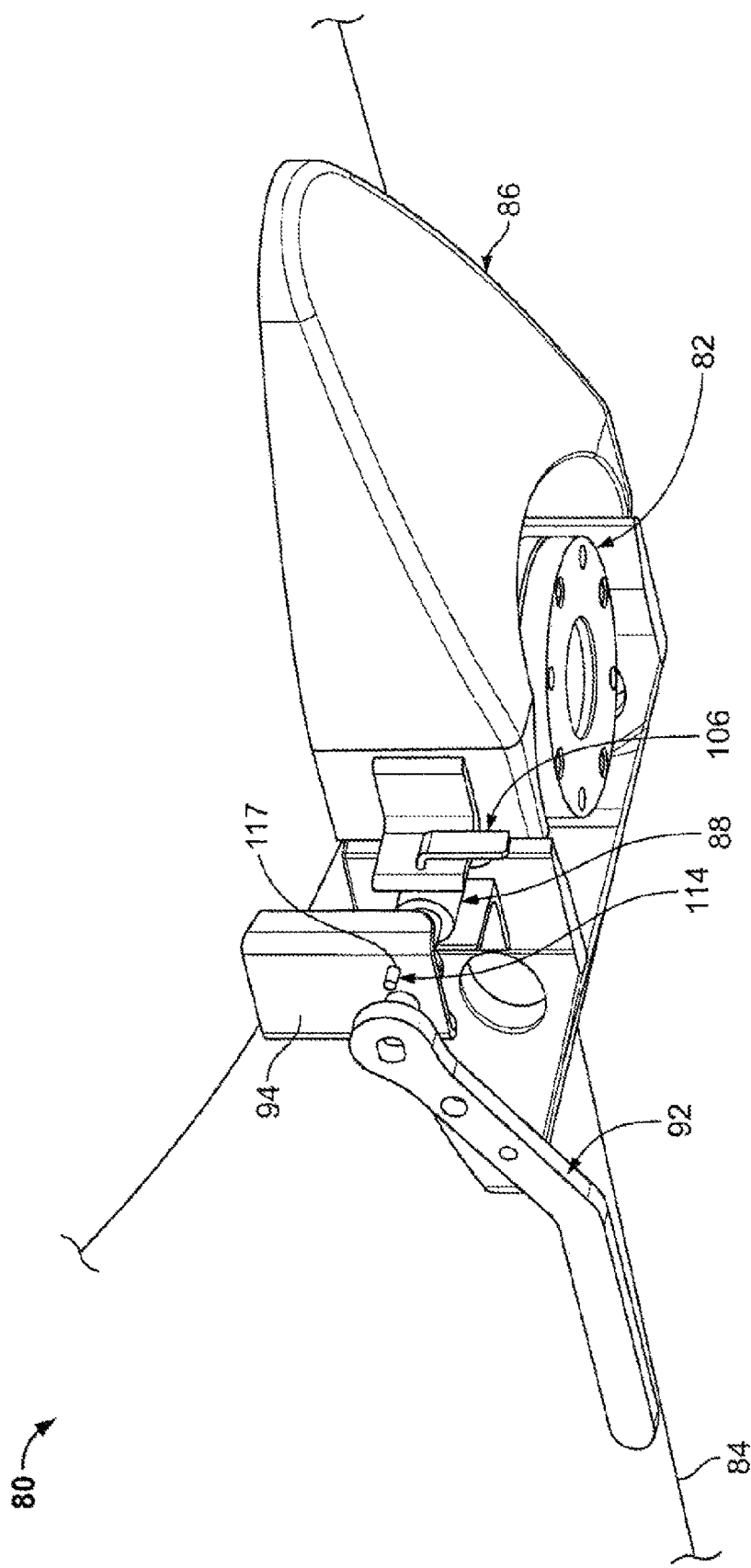
FIG. 5 is a bottom perspective view of a second embodiment of the disengaging handle assembly of the invention in a disengaged configuration.
Figure 6C:
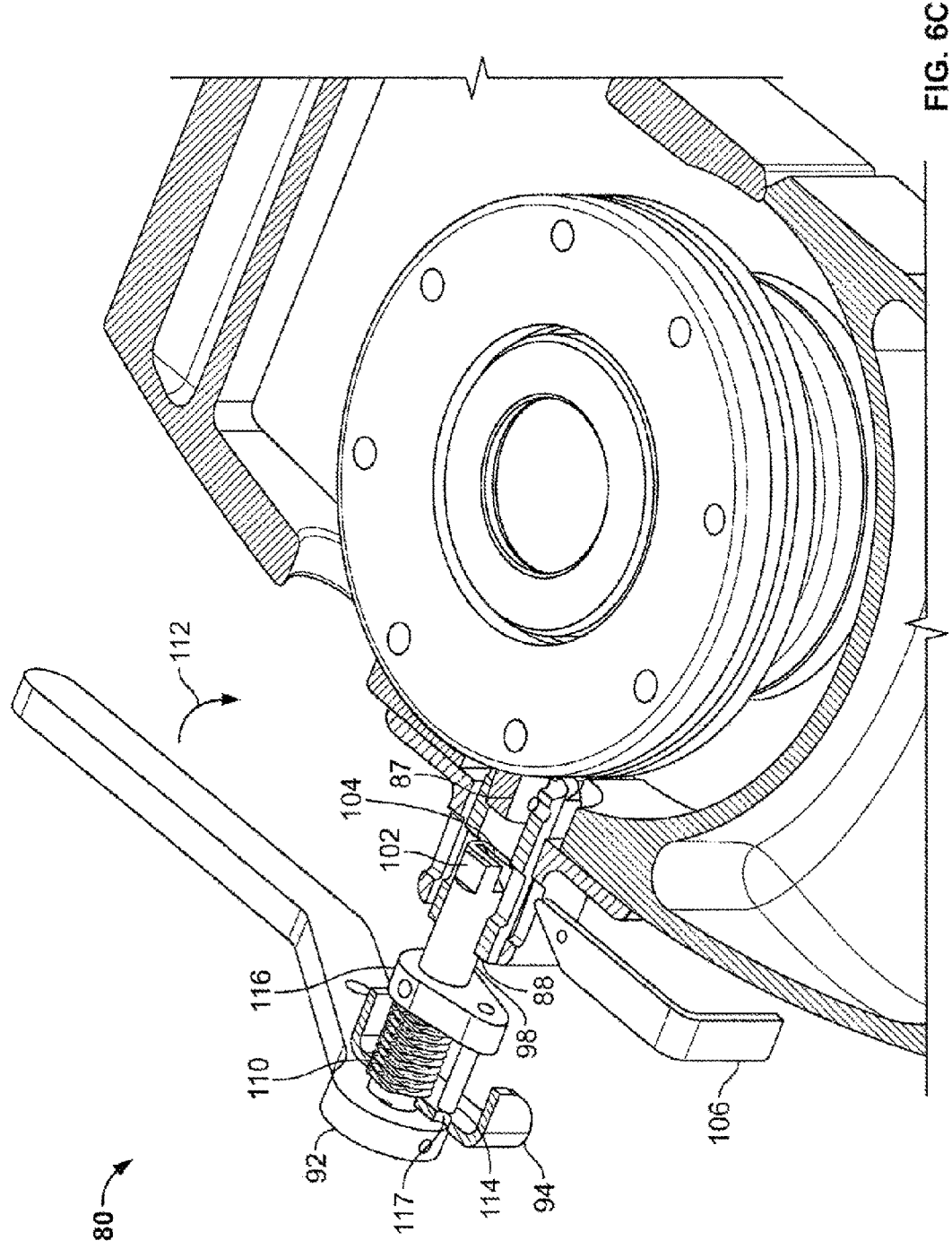
Figure 6D:
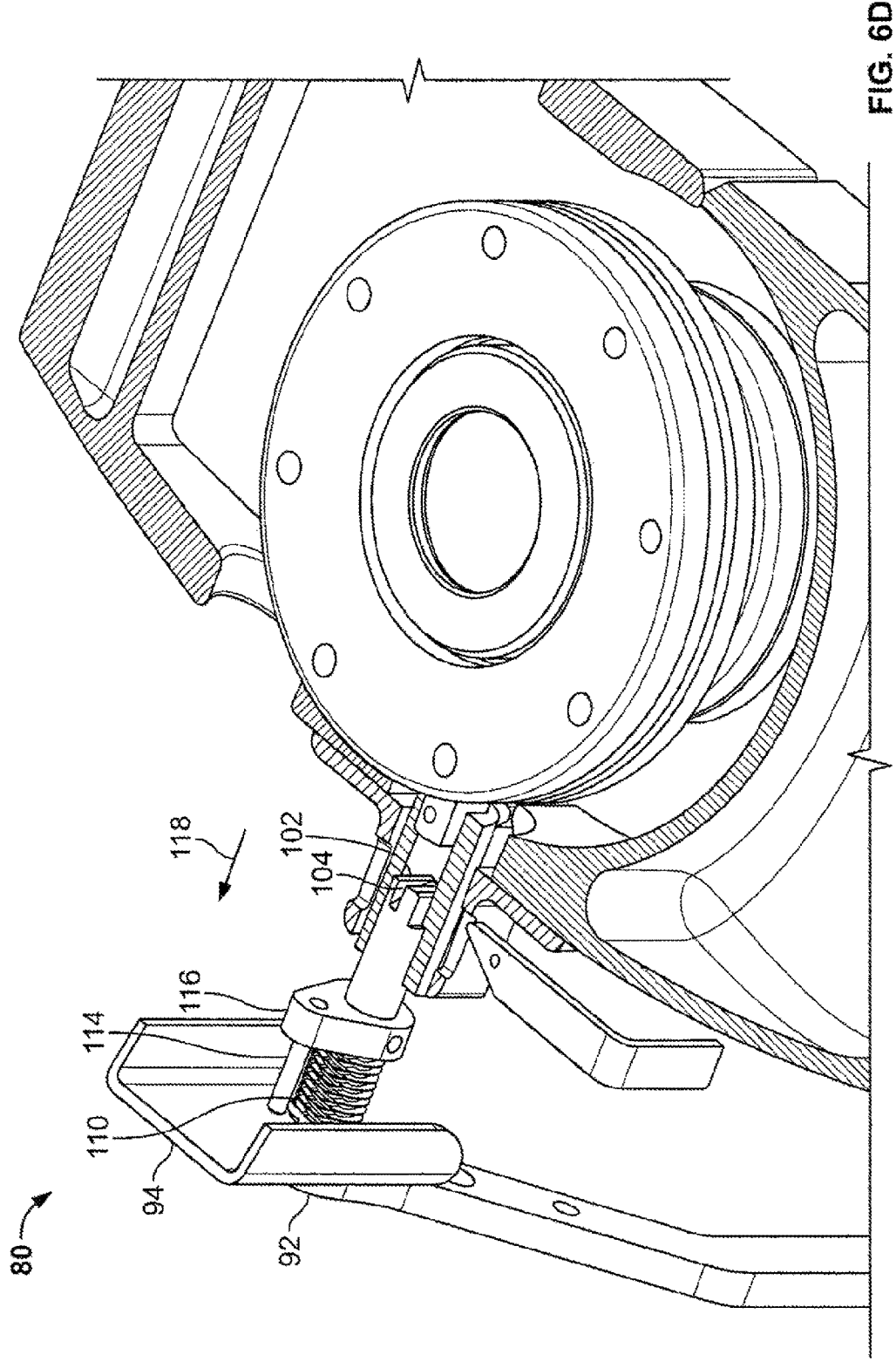

A second embodiment of the disengaging handle assembly is indicated in general at 80 in FIGS. 5-6D. As with the embodiments of FIGS. 1-4, as illustrated in FIG. 5, and as known in the art, a bottom outlet valve (BOV) 82 is attached to the bottom of the tank 84 of a railroad tank car. A skid 86 is positioned so as to surround and protect the BOV. The BOV includes a valve stem 87 (FIG. 6A) that is provided with a BOV coupler 88.

As illustrated in FIGS. 5 and 6A, and explained in greater detail below, this embodiment uses a slot and taper pin mechanism between the shaft and the BOV to engage and disengage the handle from the BOV, as well as to lock the BOV during train movement.

As illustrated in FIGS. 5 and 6A, the assembly 80 includes a handle 92 that is pivotally secured to the tank by a bracket 94 (partial views of which are provided in FIGS. 6A-6C) and a shaft 98. When the handle is turned, shaft 98 also turns. The shaft includes a tip 102 that is adapted to engage BOV coupler 88 and that features an angled groove 104.

A taper pin 106 has an angled tip 108 corresponding to the angled groove 104 in the tip of the shaft, and is in the position illustrated in FIGS. 5 and 6A during train movement, so that the tip 102 of the shaft 98 is not in engagement with the coupler 88.

In use, the operator pulls out the taper pin 106 to unlock the disengaging handle assembly so that it may engage the BOV. A wave compression spring 110 pushes the shaft into the engaged position when the taper pin is removed. The disengaging handle assembly is shown with the taper pin 106 partially removed in FIG. 6B.

With reference to FIG. 6C, the handle assembly is engaged with the BOV when flats ground into the tip 102 of the shaft are inserted into the matching hole of the BOV coupler 88. The operator then turns the handle 90° counter-clockwise, as illustrated by arrow 112 of FIG. 6C, opening the BOV. As a result, the handle 92 is in the position illustrated in FIG. 6D.

A locator pin 114 is attached to the shaft by locator pin holder 116 and engages locator pin hole 117 (FIGS. 5 and 6A-6C) formed in bracket 94 when the disengaging handle assembly 80 is in the disengaged configuration illustrated in FIGS. 5 and 6A. As illustrated in FIG. 6D, the locator pin 114 ensures that the shaft cannot be moved in the direction of arrow 118, since the locator pin is not aligned with the locator pin hole 117, so that the tip 102 of the shaft of the handle assembly cannot be disengaged from the BOV coupler 88 unless the BOV is closed, preventing the operator from accidentally leaving the BOV open during train movement.

When unloading is finished, the operator replaces the taper pin 106, by reversing the steps illustrated in FIGS. 6A-6C, so that the tip 102 of the shaft of the disengaging handle assembly is disengaged from the BOV coupler 88 and the BOV is effectively locked in the closed condition. The locator pin also locks the handle in place during train movement.

The embodiment of FIGS. 5-6D can be converted to a remote-operated handle by extending the shaft (98 of FIGS. 6A-6D) so the handle is accessible from the side of the tank car as illustrated in FIG. 4 for the previous embodiment.

Figure 7:
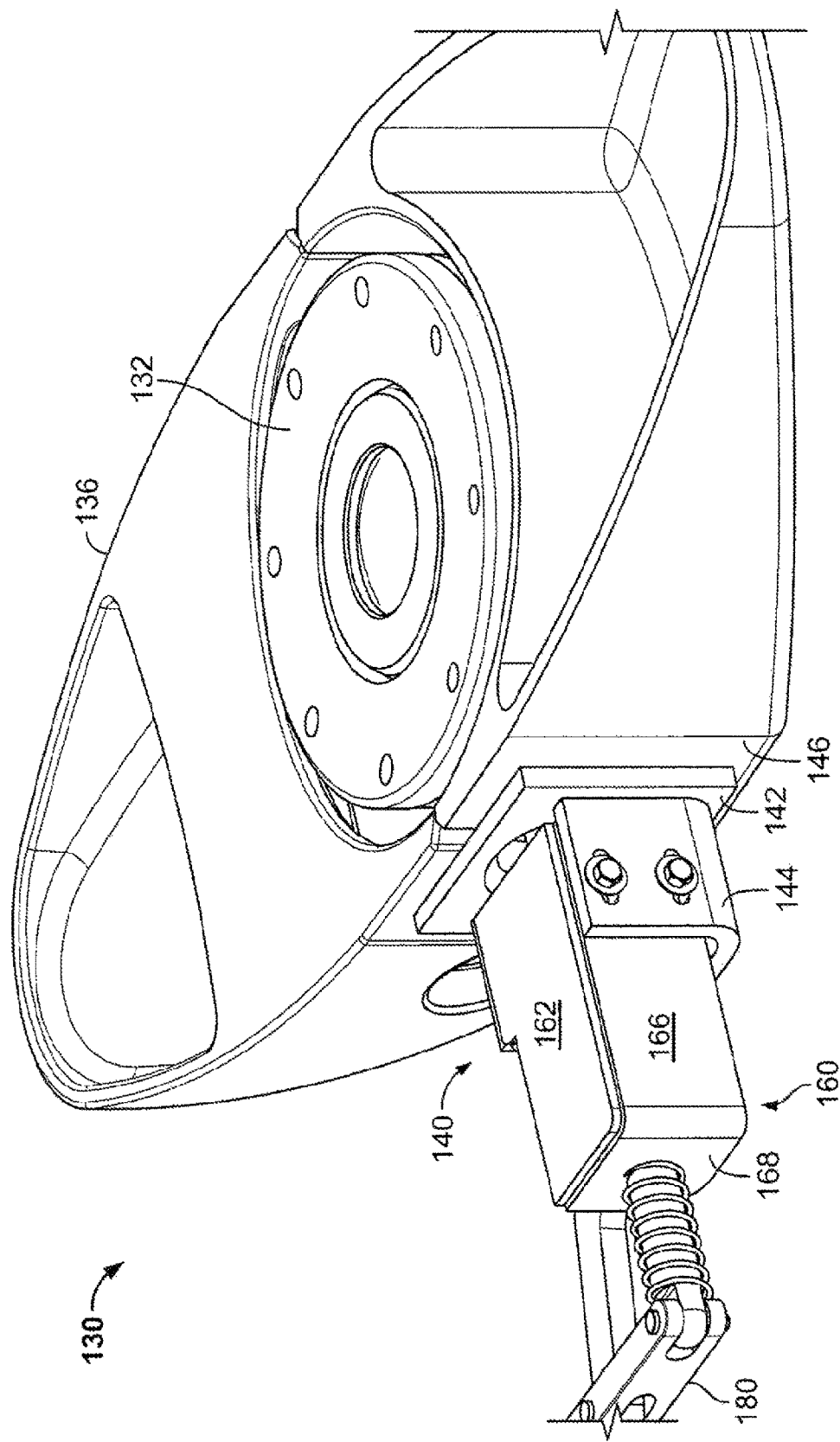
FIG. 7 is a top perspective view of third embodiment of the disengaging handle assembly of the invention in a disengaged configuration.
Figure 8:
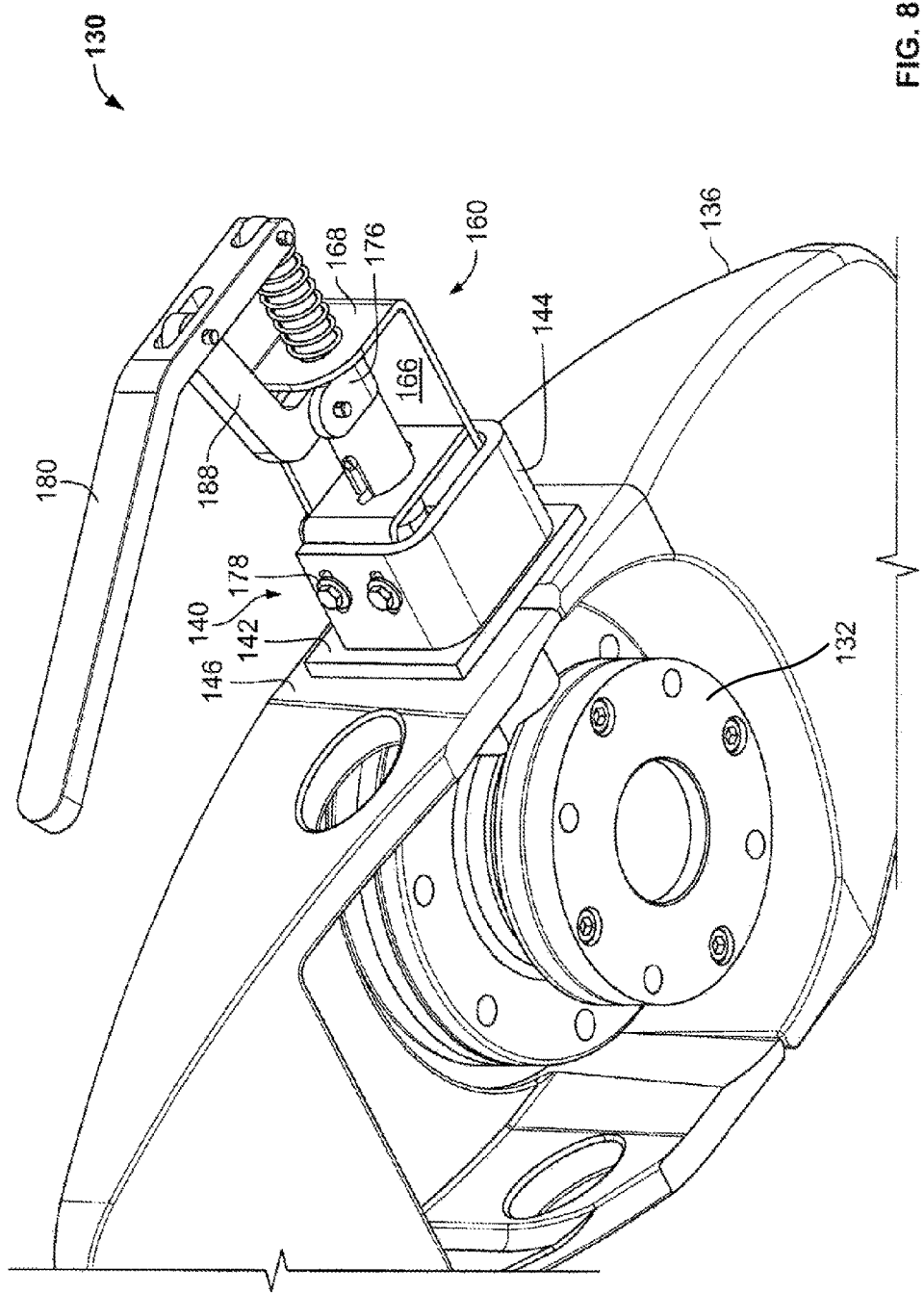
FIG. 8 is a bottom perspective view of the disengaging handle assembly of FIG. 7.
Figure 9:
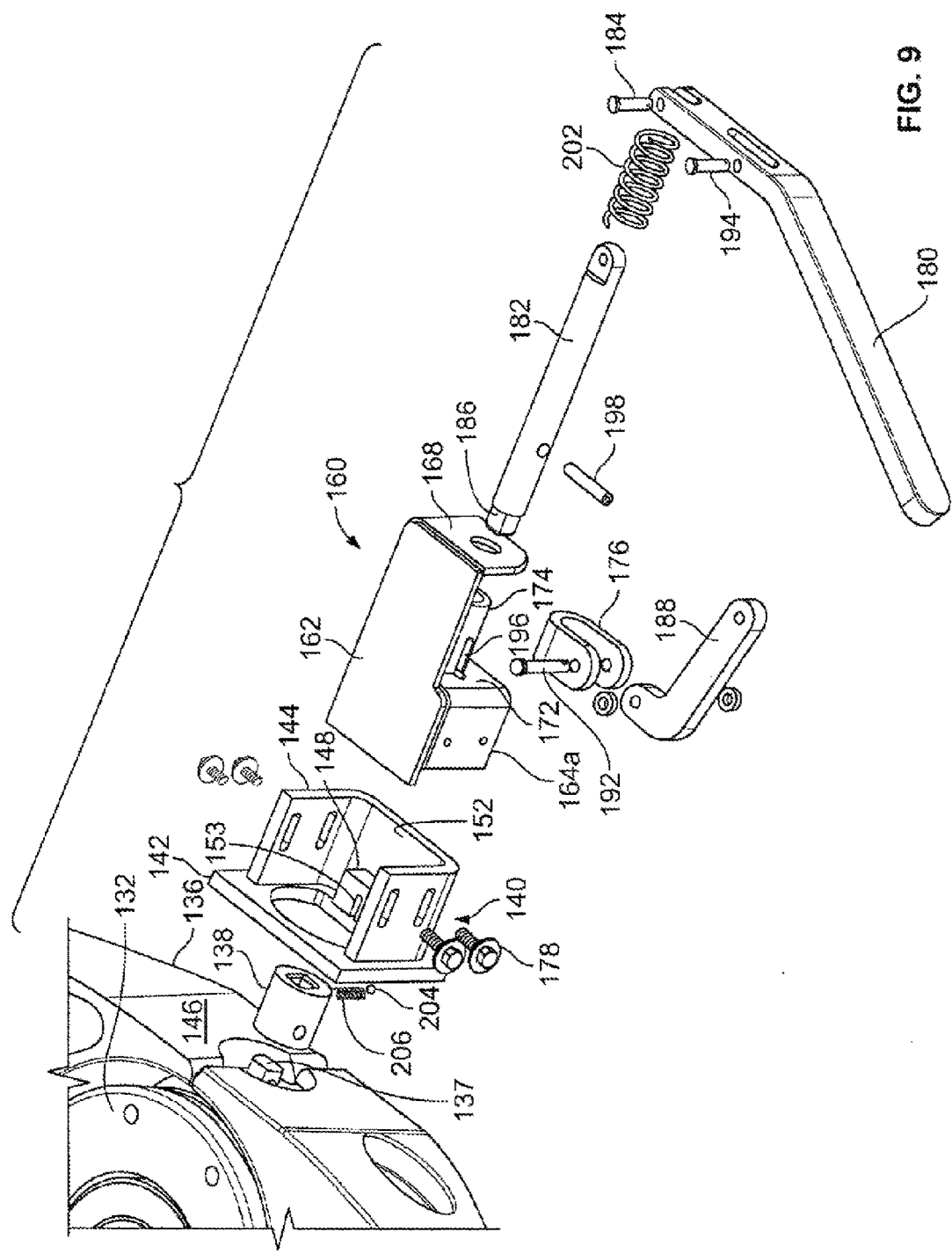
FIG. 9 is an exploded top perspective view of the disengaging handle assembly of FIG. 7.

A third embodiment of the disengaging handle assembly of the invention is indicated in general at 130 in FIGS. 7 and 8. As described for previous embodiments, a bottom outlet valve (BOV) 132 is attached to the bottom of the tank of a railroad tank car (such as tank 14 of FIGS. 1 and 4). A skid 136 is positioned so as to surround and protect the BOV. As illustrated in FIG. 9, the BOV includes a valve stem 137 that is provided with a BOV coupler 138.

As illustrated in FIGS. 7-9, the disengaging handle assembly 130 is mounted to the side of the skid 136 by a mounting bracket, indicated in general at 140, that includes a panel portion 142 and a U-shaped flange portion 144. During installation of the disengaging handle assembly, the panel portion 142 of the mounting bracket is welded to a side wall 146 of the skid 136. As illustrated in FIG. 9, a stop block 148 is secured to a bottom 152 of the mounting bracket flange portion. The stop block 148 features a channel 153, the purpose for which is explained below.

Figure 10:
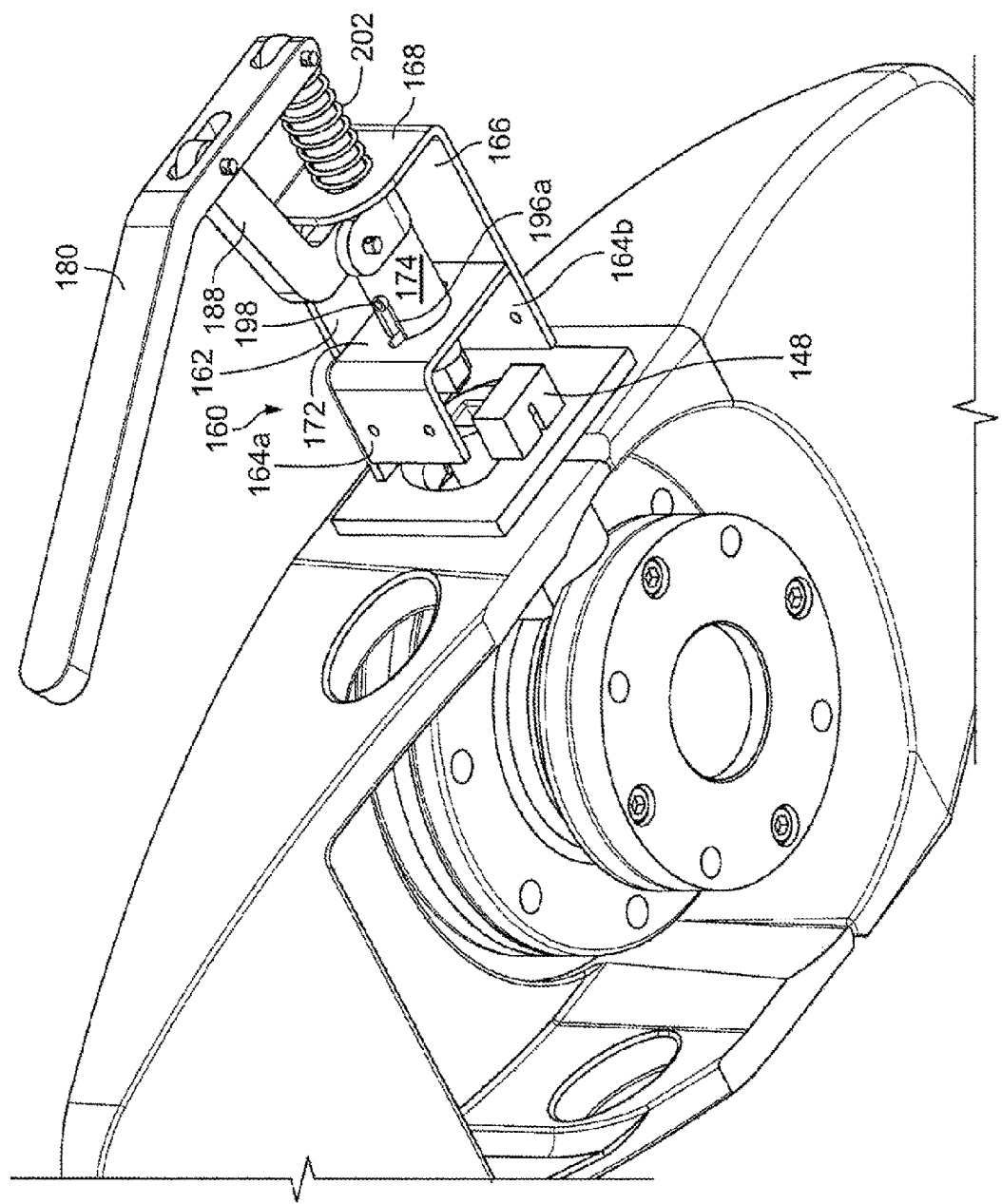
FIG. 10 is a bottom perspective view of the disengaging handle assembly of FIG. 8 with the mounting bracket flange omitted for clarity.

A shaft support assembly, indicated in general at 160 in FIGS. 7-10, is used to mount a rotating handle and handle shaft to the BOV skid 136. As shown in FIGS. 9 and 10, the shaft support assembly includes a top plate 162 to which are attached a pair of mounting tabs 164a and 164b. Mounting tab 164b extends to form a side wall 166 and an outer wall 168. Mounting tab 164a extends and is curved to form an inner wall 172. A tubular shaft guide 174 is secured by a proximal end to the inner wall 172. A U-shaped linkage bracket 176 is positioned between, but free to pivot with respect to, the distal end of the tubular guide shaft 174 and the outer wall 168 and, as explained below, is held in place by the handle shaft.

The components of the shaft support assembly 160 are preferably formed of steel and are welded together, but other materials and attachment methods may alternatively be used.

With reference to FIGS. 8 and 9, the mounting tabs 164a and 164b of the shaft support assembly 160 are secured to the U-shaped flange portion 144 of mounting bracket 140 via bolts 178 that engage corresponding openings in the two components. Of course alternative fastening arrangements may be used.

As shown in FIGS. 9 and 10, a handle 180 is pivotally attached to the distal end of a shaft 182 by pin 184. The proximal end of the shaft is provided with a tip 186 that is sized and shaped to removably engage the coupler 138 of the BOV, as explained below. A four-bar linkage is built into the handle to engage and disengage the handle from the BOV. In addition to the proximal portion of the handle 180, a portion of the shaft 182, the four-bar linkage includes a link 188 and the U-shaped linkage bracket 176. The link 188 is pivotally attached at one end to the U-shaped linkage bracket 176 via pin 192 and at the other end to handle 180 by pin 194. The U-shaped linkage bracket 176 receives the shaft 182 and is sized so that the shaft may slide with respect to the bracket.

Shaft 182 pivots within and slides horizontally through an opening formed in outer wall 168, a keyway opening formed in inner wall 172 and the tubular shaft guide 174. The tubular guide shaft 174 features a pair of opposing slots 196. A pin 198 passes through the shaft in a fixed fashion and extends through the slots 196 of the tubular shaft guide. A compression coil spring 202 is sized to receive the shaft 182 and is engaged at one end by the proximal end of handle 180 and the outer surface of outer plate 168. As a result, the coil spring 202 urges the handle and shaft into the disengaged position illustrated in FIGS. 7, 8, 10 and 11A.

Figure 11A:
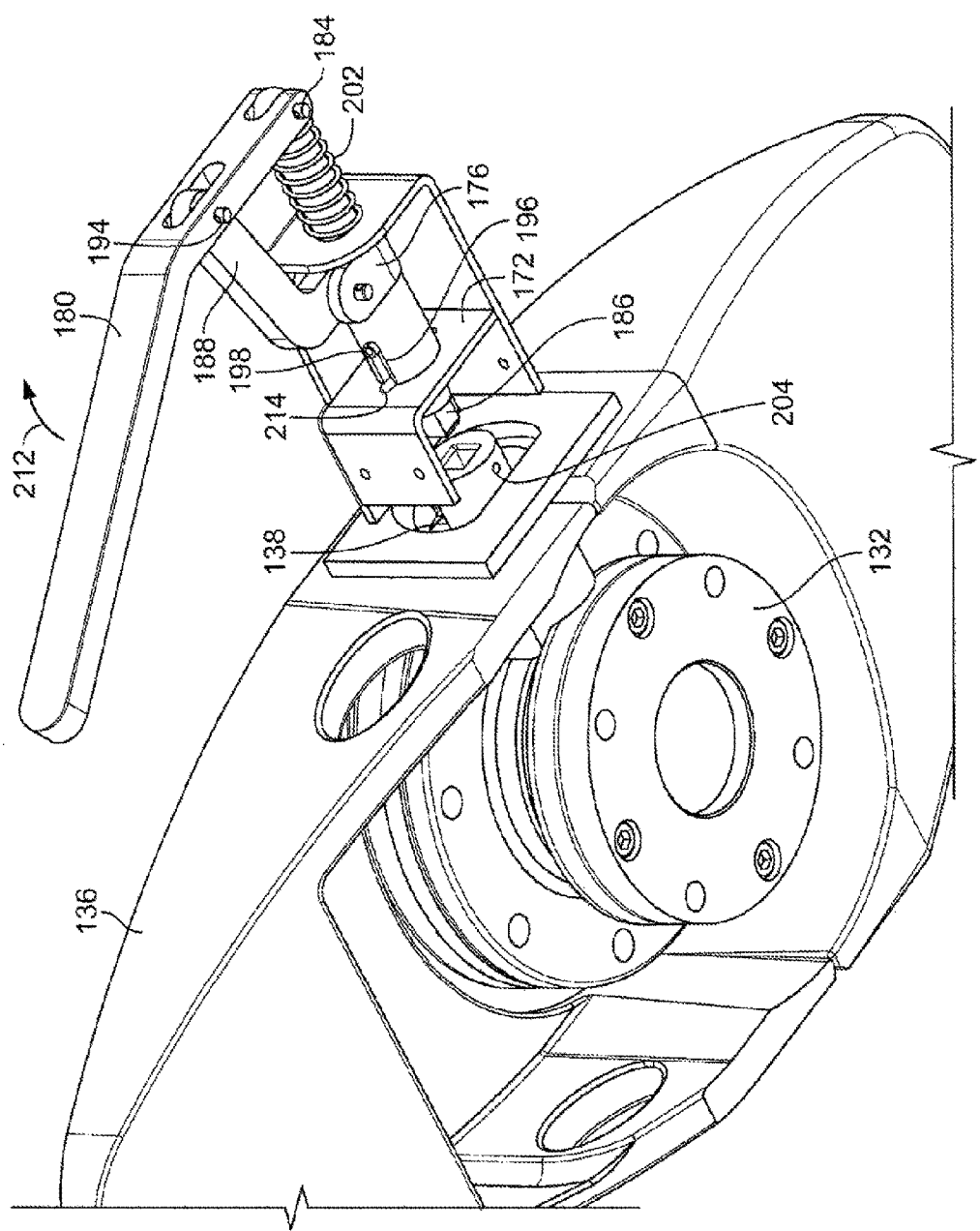

With reference to FIG. 9, the coupler 138 is provided with a spring pin that includes a ball 204 and a compression coil spring 206. As illustrated in FIG. 11A, the compression coil spring urges the ball 204 downward so that it extends out of an opening formed in the bottom of the coupler 138. The spring pin ball 204 (of FIGS. 9 and 11A) engages the channel 153 of the stop block 148 (of FIG. 9) when the BOV is in the closed configuration. As a result, the BOV will not accidently open due to vibrations or shocks when the tank car is in transit. This BOV lock, however, may be easily overcome when the BOV is actuated via the handle 180 and shaft 182 as follows.

Use of the disengaging handle assembly will now be explained with regard to FIGS. 11A-11C.

Starting with the disengaging handle assembly in the disengaged configuration or position of FIG. 11A, where the BOV is in the closed condition, the operator pulls on the handle 180, in the direction of arrow 212 of FIG. 11A. This pushes the tip 186 of the shaft into the BOV coupler 138, against the urging of spring 202, so that the handle is coupled to the BOV. More specifically, the handle is engaged when flats ground into the tip 186 of the shaft are inserted into a matching bore or hole in the BOV coupler 138. As a result, the disengaging handle assembly is in the engaged configuration illustrated in FIG. 11B. The BOV 132 is still closed at this time. As the shaft, and thus pin 198, moves towards the BOV 132, the handle 180 rotates about the pin 194 so that a fulcrum is provided so as to facilitate the operation. In addition, the ends of the shaft pin 198 move through the keyway opening 214 formed in the inner wall 172 of the shaft support assembly as they move towards the BOV.

Figure 11B:
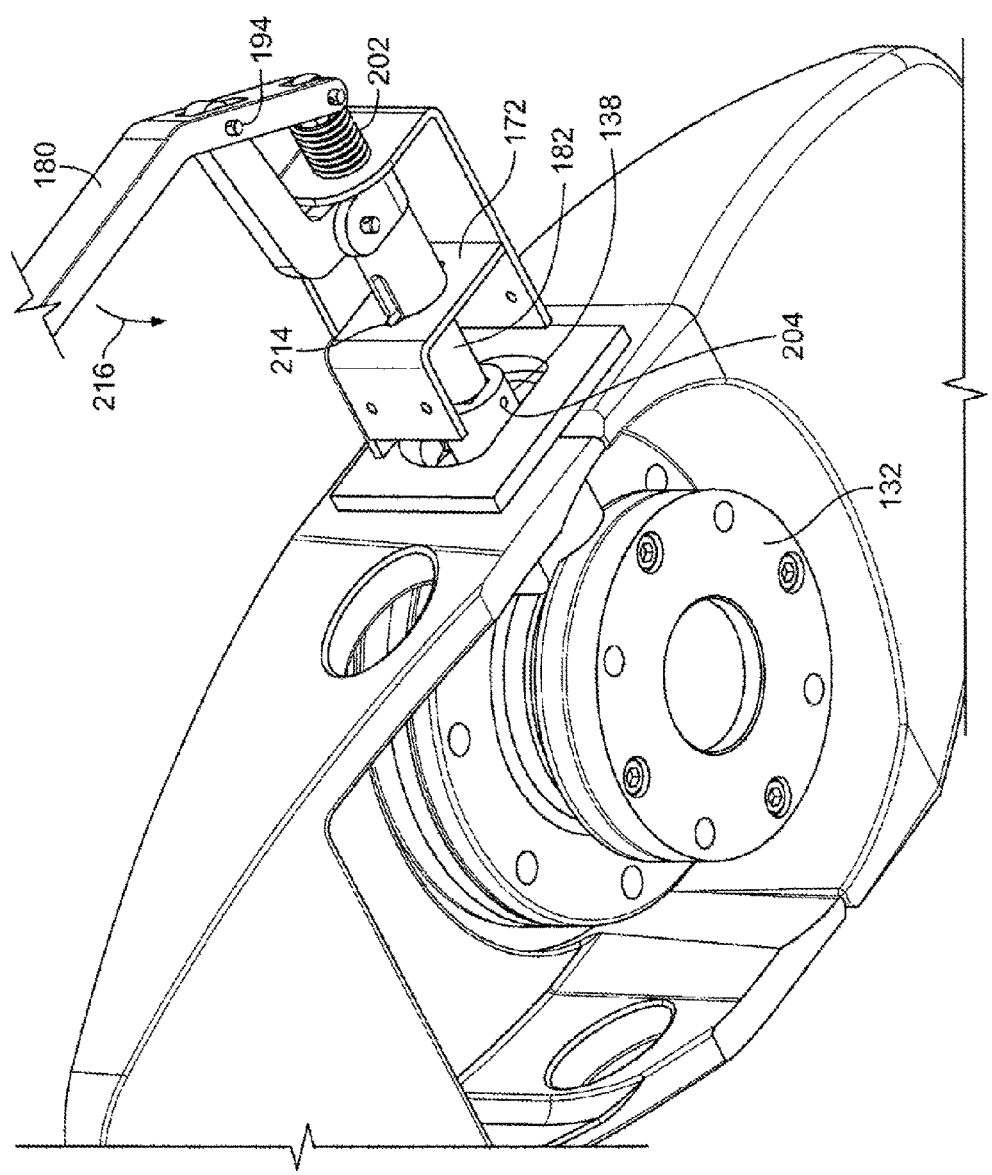

Next, with reference to FIGS. 11B and 11C, the operator turns the handle generally 90° counter-clockwise, as illustrated by arrow 216 in FIG. 11B. This causes the shaft 182 to also rotate so that the coupler 138 is rotated and the BOV 132 is opened. As the coupler 138 rotates, the spring pin ball 204 (FIGS. 11A and 11B) disengages the channel 153 of the stop block 148 (FIGS. 9 and 10). The handle 180 is now in the position illustrated in FIG. 11C. It should be noted that the U-shaped linkage bracket 176 and link 188 have also been rotated with respect to the shaft support assembly. The pin 198 has been rotated with respect to the keyhole opening 214 so that the shaft 182 cannot be slid away from the BOV due to the ends of the pin being blocked by the inner surface of the inner wall 172 of the shaft support assembly. This ensures that the tip of the shaft of the handle assembly cannot be disengaged from the BOV coupler 138 unless the BOV is closed, preventing the operator from accidentally leaving the BOV open during train movement.

The compression spring 202 pushes the handle 180 and shaft 182 back to their default, disengaged positions of FIG. 11A when the handle is pivoted back into the position of FIG. 11B and the BOV is closed.

As illustrated in FIG. 12, the disengaging handle assembly 130 of FIGS. 7-11C can be converted to a remote-operated handle by providing the disengaging handle assembly with an extended shaft 218 so that the handle 180 is accessible from the side of the tank car. More specifically, a cover 222 is positioned over the mounting bracket 140 and features an opening through which the extended shaft 218 passes and may rotate and slide. A drop member 224 is attached to the tank 226 of a railroad tank car or the like. The shaft support assembly 160 is secured to the bottom end of the drop member 224.

Figure 13:
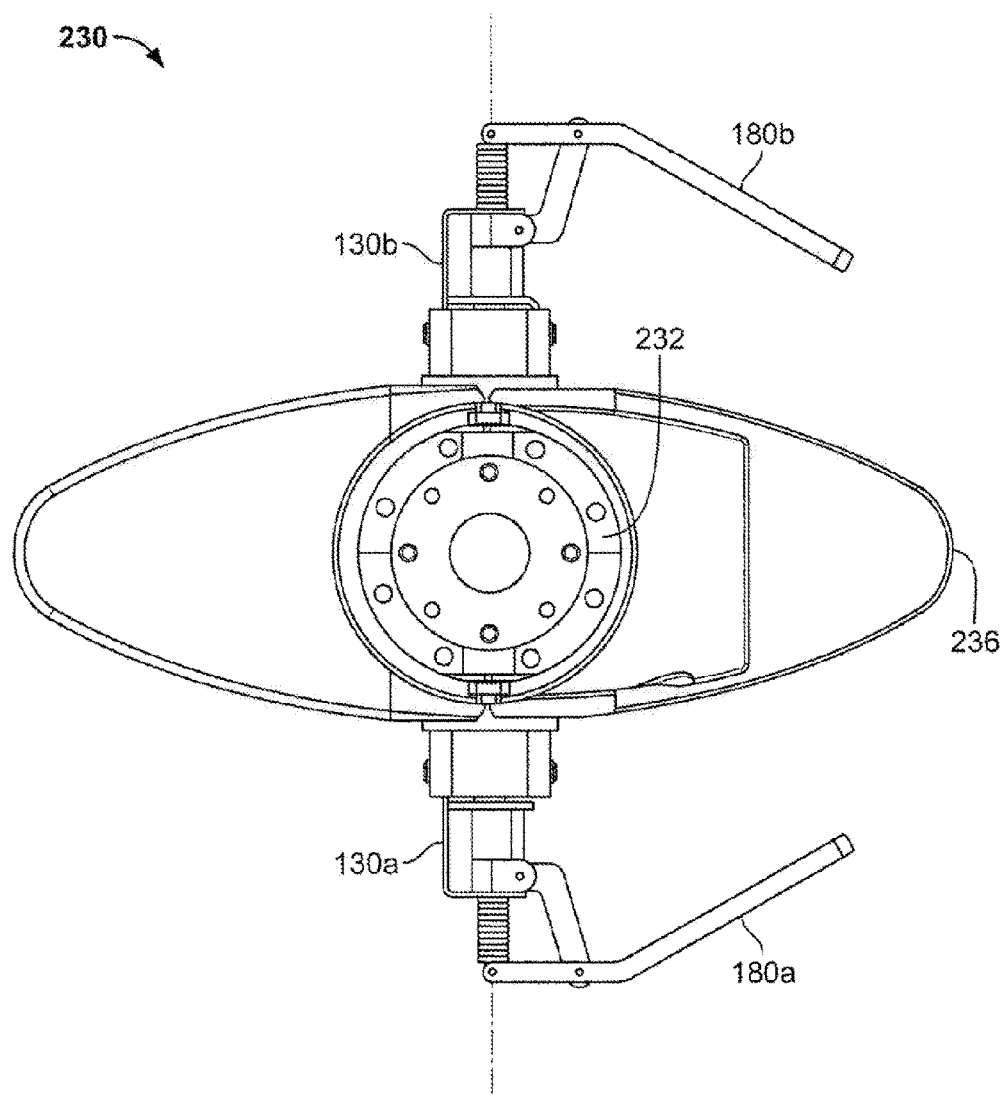
FIG. 13 is a bottom plan view of a fourth embodiment of the disengaging handle assembly of the invention

With reference to FIG. 13, the bottom of the tank 230 of a railroad tank car may be provided with a BOV 232 that may be opened from either side of the vehicle. In such a situation, the tank car may be provided with two of the disengaging handle assemblies, indicated at 130a and 130b in FIG. 13, with one on each side of the tank car. Each of disengaging handle assemblies 130a and 130b of FIG. 13 may have the construction of any of the disengaging handle assembly described above with regard to FIGS. 7-11C. Such an arrangement permits the BOV 232 to be opened by actuation of either handle 180a or 180b. Of course the embodiments of the disengaging handle assemblies of FIGS. 1-6D could be substituted for the embodiment 130 of FIGS. 7-11C. In addition, the disengaging handle assemblies 130a and 130b could both be configured for remote operation, such as in the manner illustrated in FIGS. 4 and 12.

Figure 14:
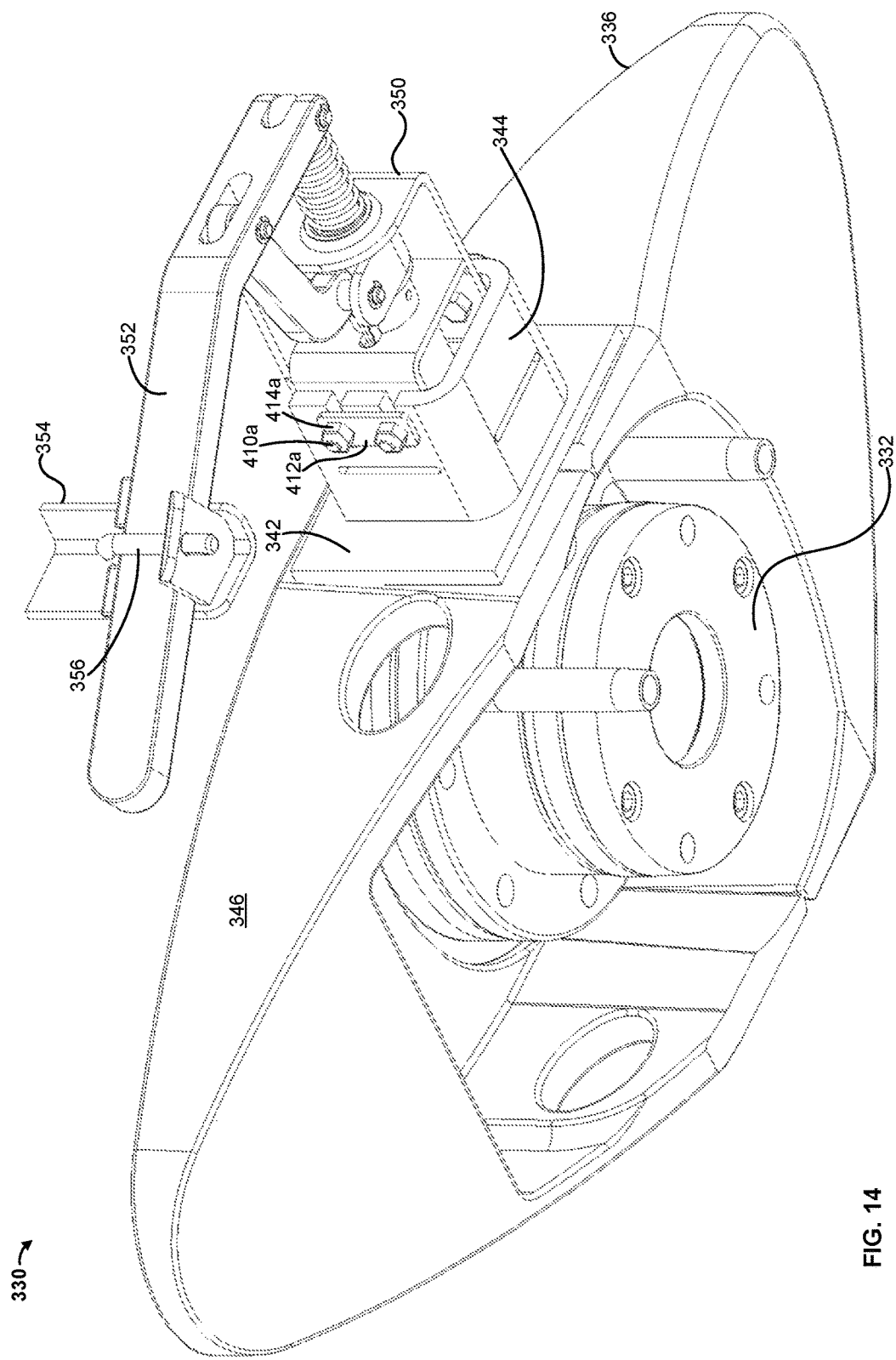
FIG. 14 is a bottom perspective view of a fifth embodiment of the disengaging handle assembly of the invention.

A fifth embodiment of the disengaging handle assembly of the invention is indicated in general at 330 in FIG. 14. As described for previous embodiments, a bottom outlet valve (BOV) 332 is attached to the bottom of the tank of a railroad tank car (such as tank 14 of FIGS. 1 and 4). A skid 336 is mounted to the tank and positioned so as to surround and protect the BOV.

As illustrated in FIG. 14, the disengaging handle assembly 330 is mounted to the side of the skid 336 by a mounting panel 342 and a U-shaped housing 344, both of which are preferably formed from steel. During installation of the disengaging handle assembly, the panel portion 342 of the mounting bracket is welded to a side wall 346 of the skid 336, and the U-shaped housing is welded to the panel portion 342 (either before or after installation of the panel portion 342 onto the skid). As will be explained in greater detail below, the remaining components of the disengaging handle assembly are secured to and within the housing 344 by way of a shaft support bracket 350.

Figure 15A:
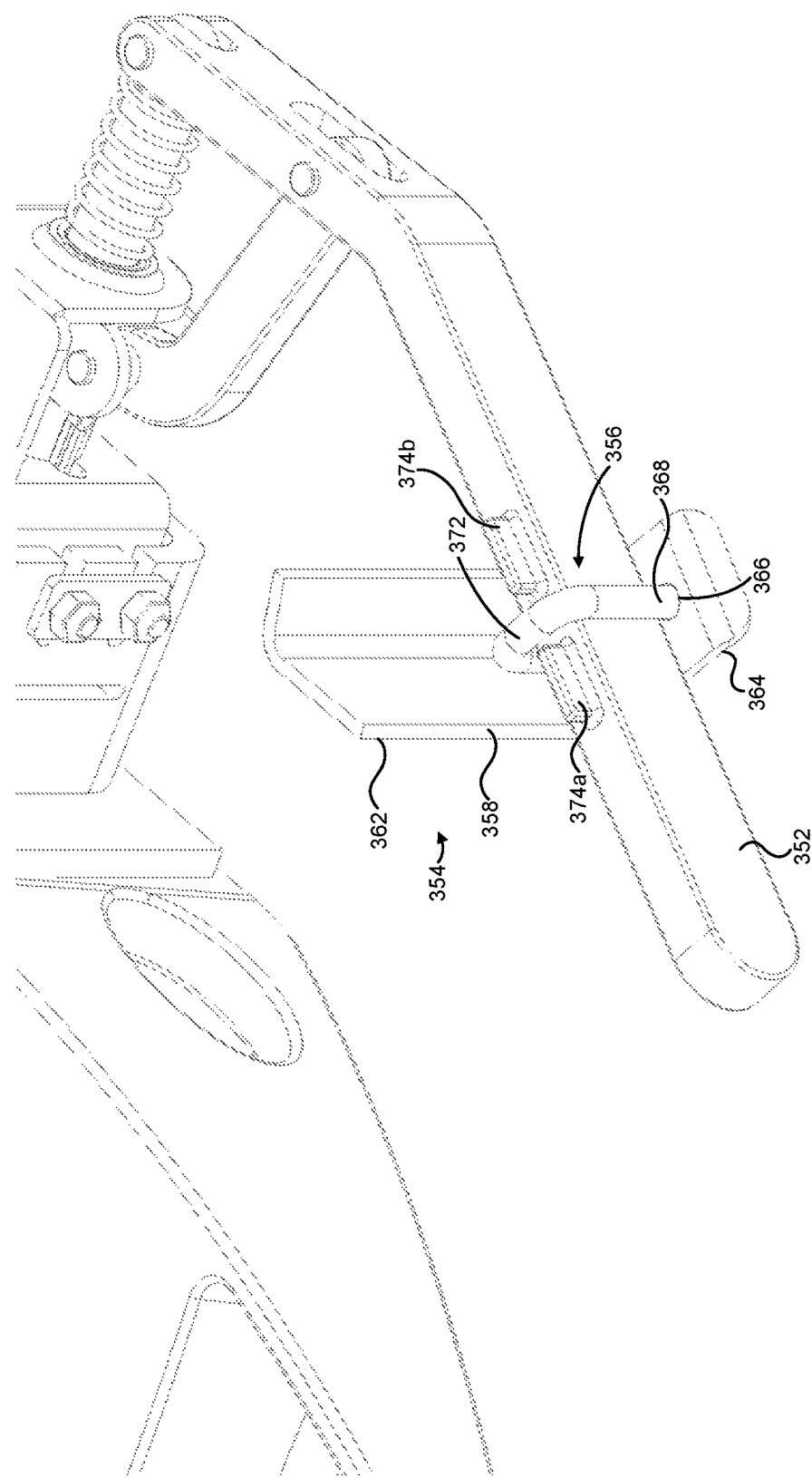
FIG. 15A is an enlarged top perspective view of the handle latch bracket and latching member of FIG. 14 in the locked configuration.

As in previous embodiments, the disengaging handle assembly is actuated by a user turning a handle 352 so that it rotates with respect to the shaft support bracket 350. The handle 352 is held in a transport position, illustrated in FIG. 14, where the disengaging handle assembly is not connected to the stem of the BOV 332, by way of a latch bracket 354 and a latching member 356. More specifically, with reference to FIGS. 15A and 15B, the latch bracket 354 is generally L-shaped and features a generally vertical portion 358 with a top end portion 362 that attaches to the outer jacket of the railcar tank (such as tank 14 of FIGS. 1 and 4). The latch bracket also features an outwardly extending latch support tab 364, that is attached by its proximal end to the generally vertical portion 358. The distal end portion of the latch support tab 364 features a latch opening 366. The latching member 356 features an inverted hook or J-shape with a pin portion 368 that is received within the latch opening 366. When this occurs, as illustrated in FIG. 15A, the hook portion 372 of the latching member engages the handle 352 and secures it to the latch bracket 354. This keeps the handle 352 from moving during transport of the tank car. The handle 352 preferably includes a pair of projections 374a and 374b which define a space there between that receives the hook portion of the latching member.

Figure 15B:
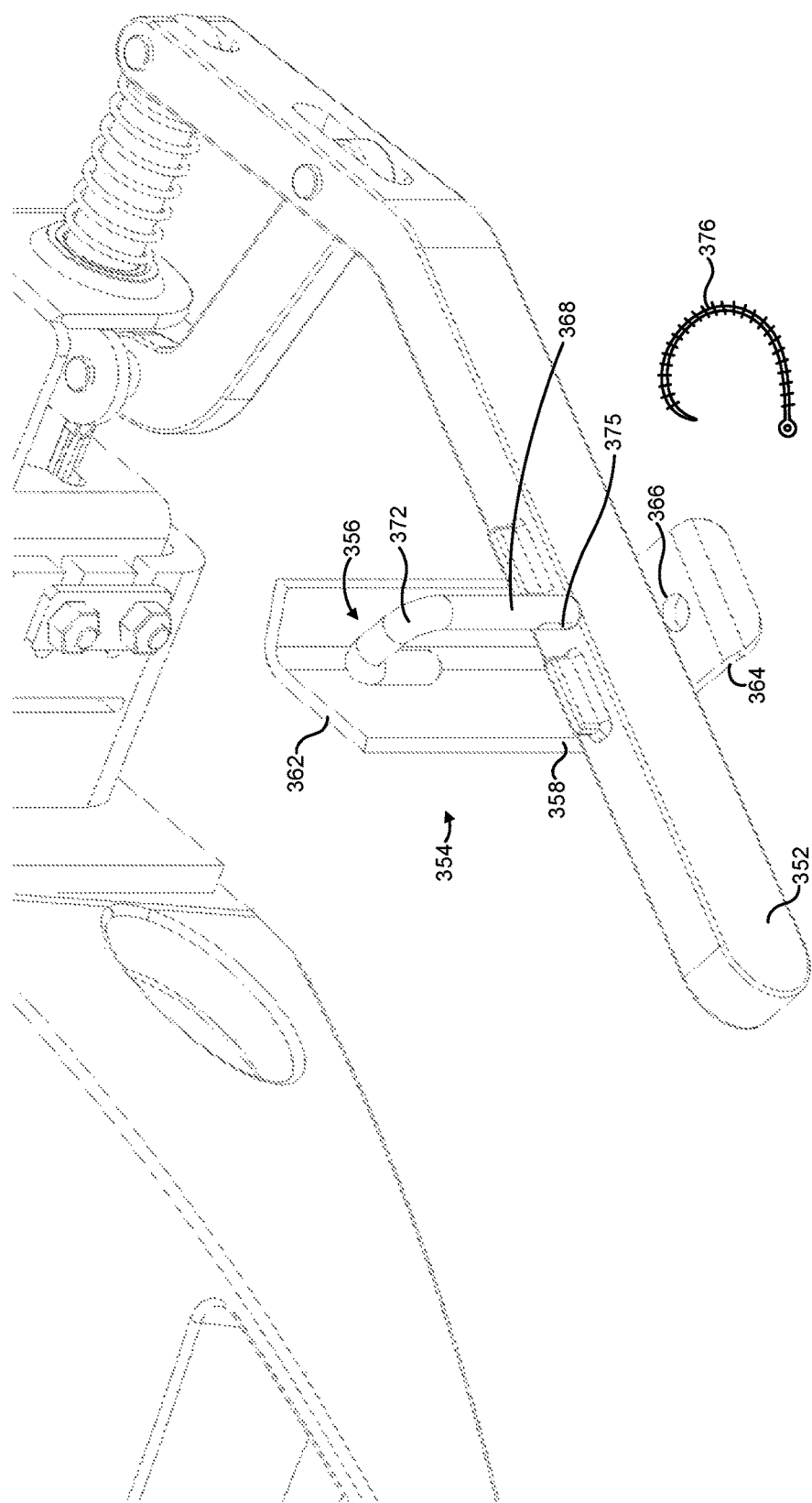
FIG. 15B is an enlarged top perspective view of the handle latch bracket and latching member of FIG. 14 in the unlocked configuration.

As illustrated in FIG. 15B, the pin portion 368 of the latching member is provided with an aperture 375. When the latching member 356 is in the position illustrated in FIG. 15A, a plastic zip tie 376 (FIG. 15B) or the like may be placed through the aperture 375 and locked in place. As a result, the plastic zip tie would have to be cut or otherwise damaged to remove the latching member 356 from the latch bracket 354. This enables the plastic zip tie (or similar structure) to serve as a tamper evidence seal with respect to use of the handle 352.

Figure 16:
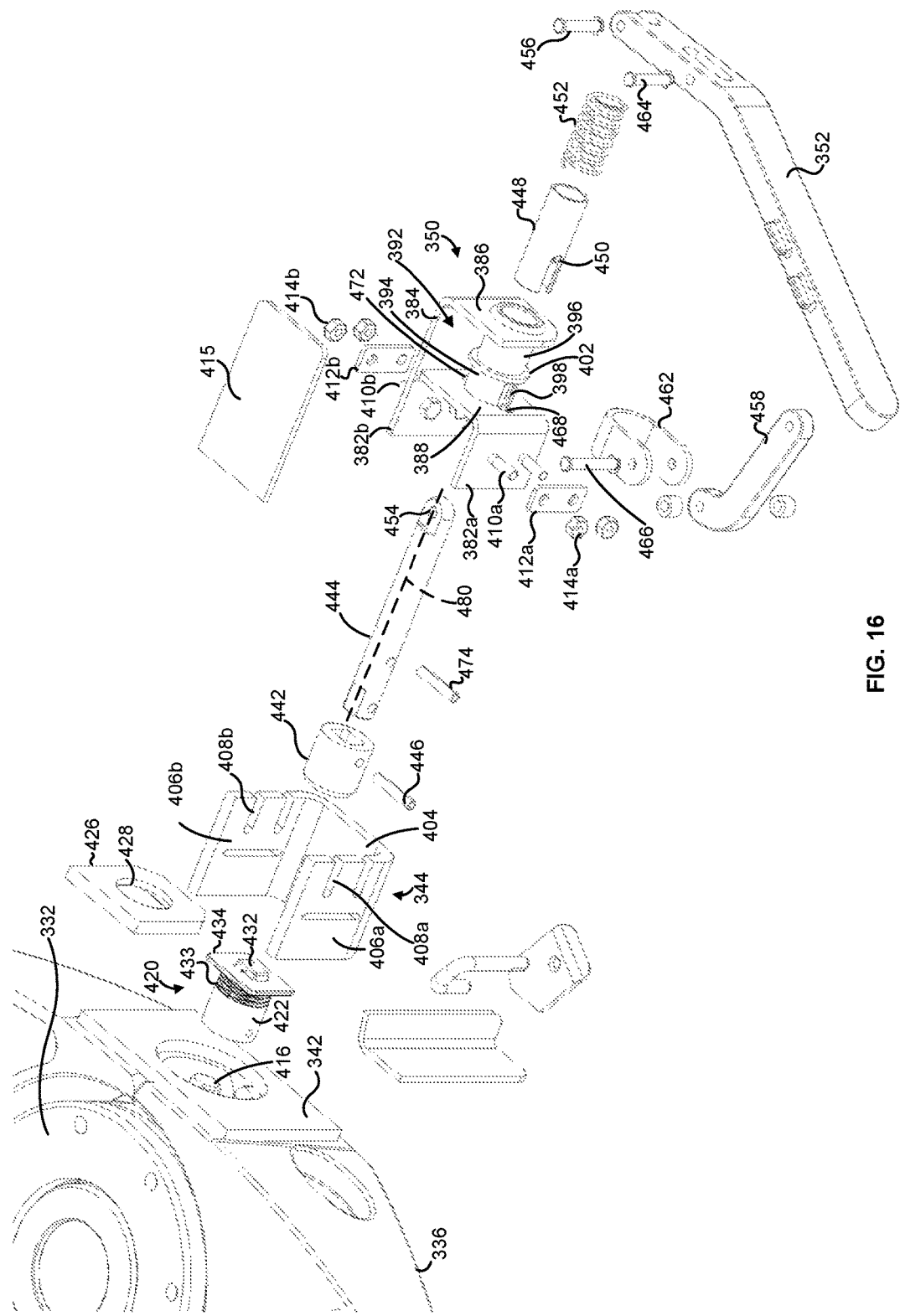
FIG. 16 is an exploded top perspective view of the disengaging handle assembly of FIG. 14.

Turning to FIG. 16, where an exploded view of the disengaging handle assembly is presented, the shaft support bracket 350 includes a pair of mounting tabs 382a and 382b. Mounting tab 382b extends to form a side wall 384 and an angled outer wall 386. Mounting tab 382a extends and is angled to form an inner wall 388. A tubular shaft guide, indicated in general at 392 is secured by an inner portion 394 to the inner wall 388 and an outer portion 396 to outer wall 386. The inner portion of the tubular shaft guide features an opposing pair of channels (one of which is visible at 398) and is separated from the outer portion by collar 402.

The components of the shaft support bracket 350 are preferably formed of steel and are welded together, but other materials and attachment methods may alternatively be used.

With continued reference to FIG. 16, the housing 344 features a bottom panel 404 and sidewalls 406a and 406b. Parallel slots 408a and 408b are formed in the sidewalls and receive bolts 410a and 410b that are placed through openings in the mounting tabs 382a and 382b. As shown in FIGS. 14 and 16, washer plates 412a and 412b and positioned under nuts 414a and 414b that engage the bolts 410a and 410b. As a result, the mounting tabs 382a and 382b of the shaft support bracket 350 are secured to the U-shaped housing 344 in the manner shown in FIG. 14. Of course alternative fastening arrangements may be used.

A top panel 415 (FIG. 16) is secured to the top of the sidewalls of the housing 344, preferably by welding, to protect the components positioned therein, described below, from whether and debris.

As illustrated in FIG. 16, the BOV includes a valve stem 416 that is turned to open and close the BOV.

Figure 17:
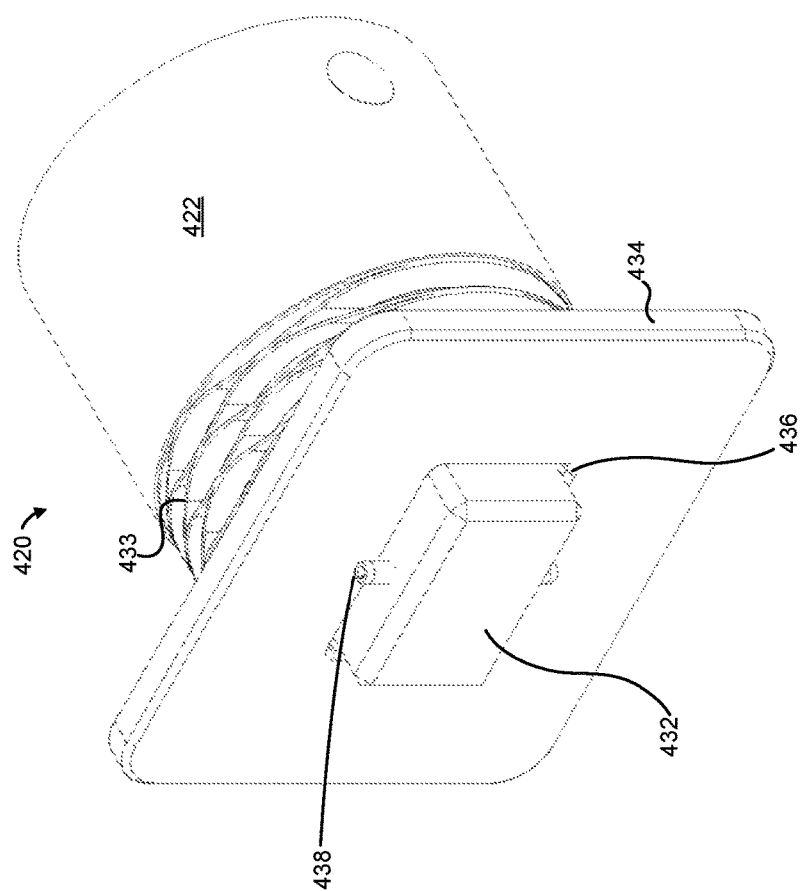
FIG. 17 is an enlarged front perspective view of the stem coupler assembly of the disengaging handle assembly of FIG. 16.
Figure 18:
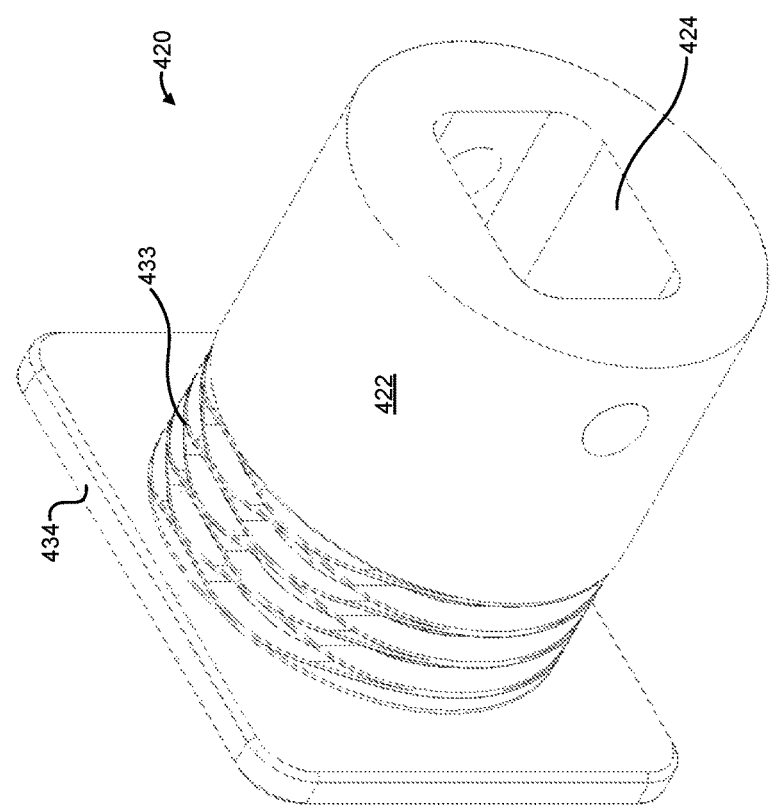
FIG. 18 is a rear perspective view of the stem coupler assembly of FIG. 17.
Figure 19A:
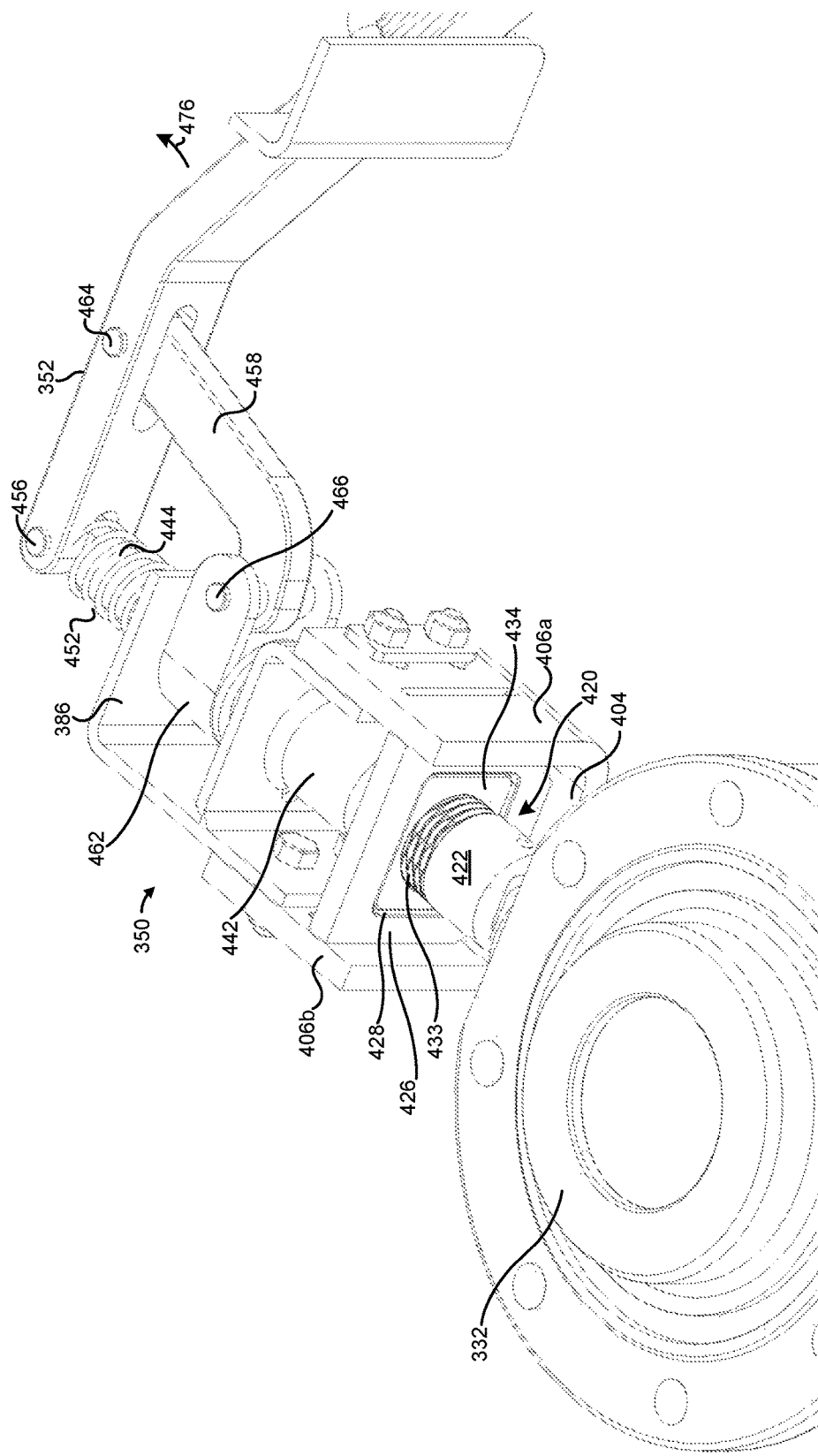
FIGS. 19A-19C are top perspective views of the disengaging handle assembly of FIG. 14 with the top plate omitted for clarity and illustrating the disengaging handle assembly in the disengaged, engaged (with BOV closed) and engaged (with BOV open) configurations, respectively.

A female-male stem coupler assembly, indicated in general at 420 in FIGS. 16-18, features a socket portion 422 that includes a recess 424 (FIG. 18) that receives the BOV valve stem 416. As a result, the stem coupler assembly is mounted on the BOV valve stem 416. A divider wall, illustrated at 426 in FIG. 16, features a window 428. As illustrated in FIG. 19A, the divider wall 426 is secured to the sidewalls 406a and 406b and bottom panel 404 of the housing, such as by welding (or any other fastening arrangement).

The stem coupler assembly 420 includes a stem or male portion 432 (FIGS. 16 and 17) that features a rectangular cross section and that is connected to the socket portion 422. A wave compression spring 433 features a central opening that receives the male portion 432. A rectangular stop plate 434 (which may be any alternative shape) features a central opening 436 that also receives the male portion 432 in a sliding fashion. As best illustrated in FIG. 17, the wave spring is preferably placed in slight compression between the stop plate 434 and the socket portion 422, and a pin 438 is positioned through a bore formed in the male portion so that the entire female-male stem coupler assembly is held together.

Returning to FIG. 16, a female-female adapter 442 is attached to the proximal end of a shaft 444 by a pin 446. The adapter 442 has a nose with a recess that is configured to engage the stem 432 of the female-male stem coupler assembly in a removable fashion and to push the stop plate toward the BOV when the disengaging handle assembly is actuated (to push the shaft into the engagement position), as will be explained below.

Figure 19B:
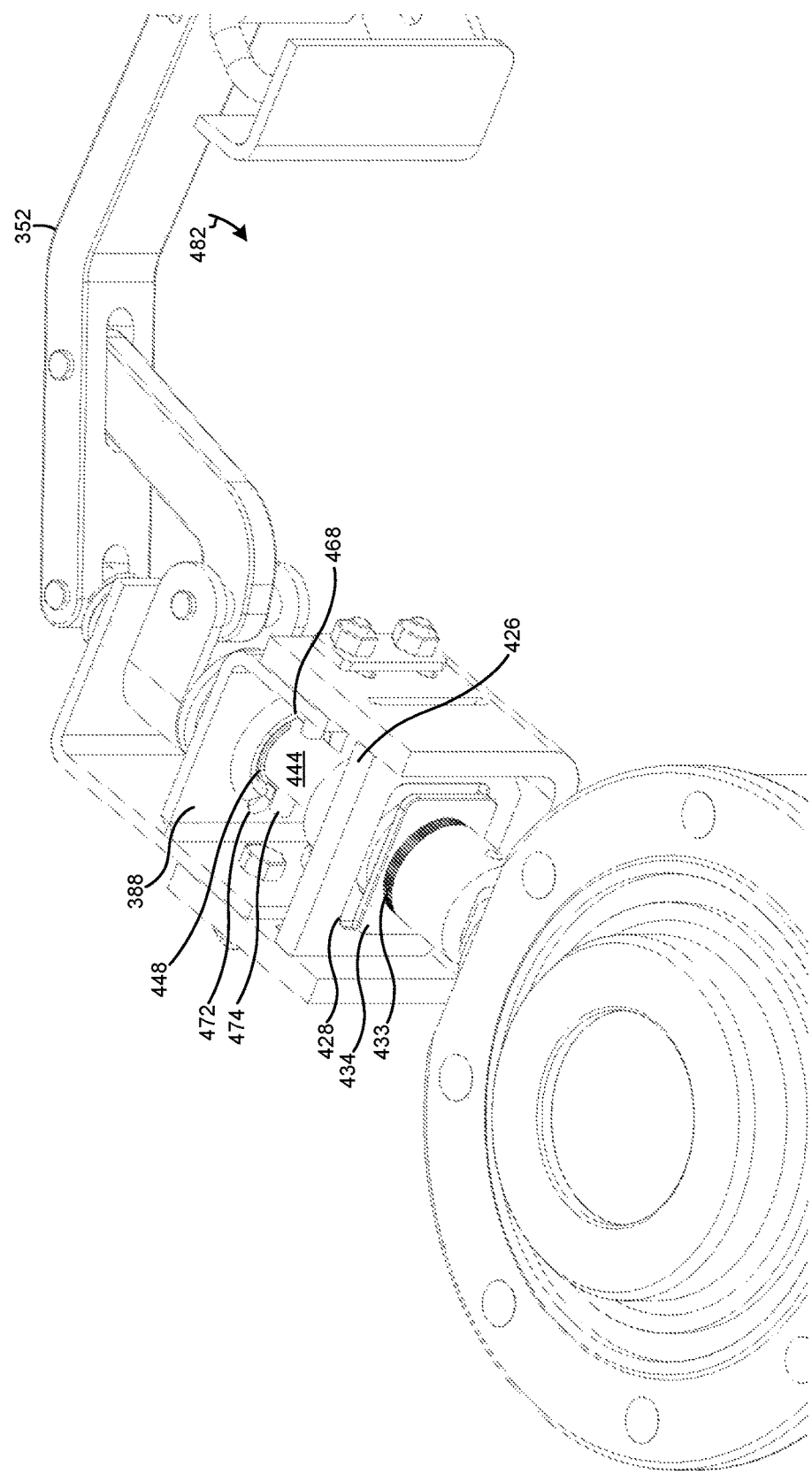
Figure 19C:
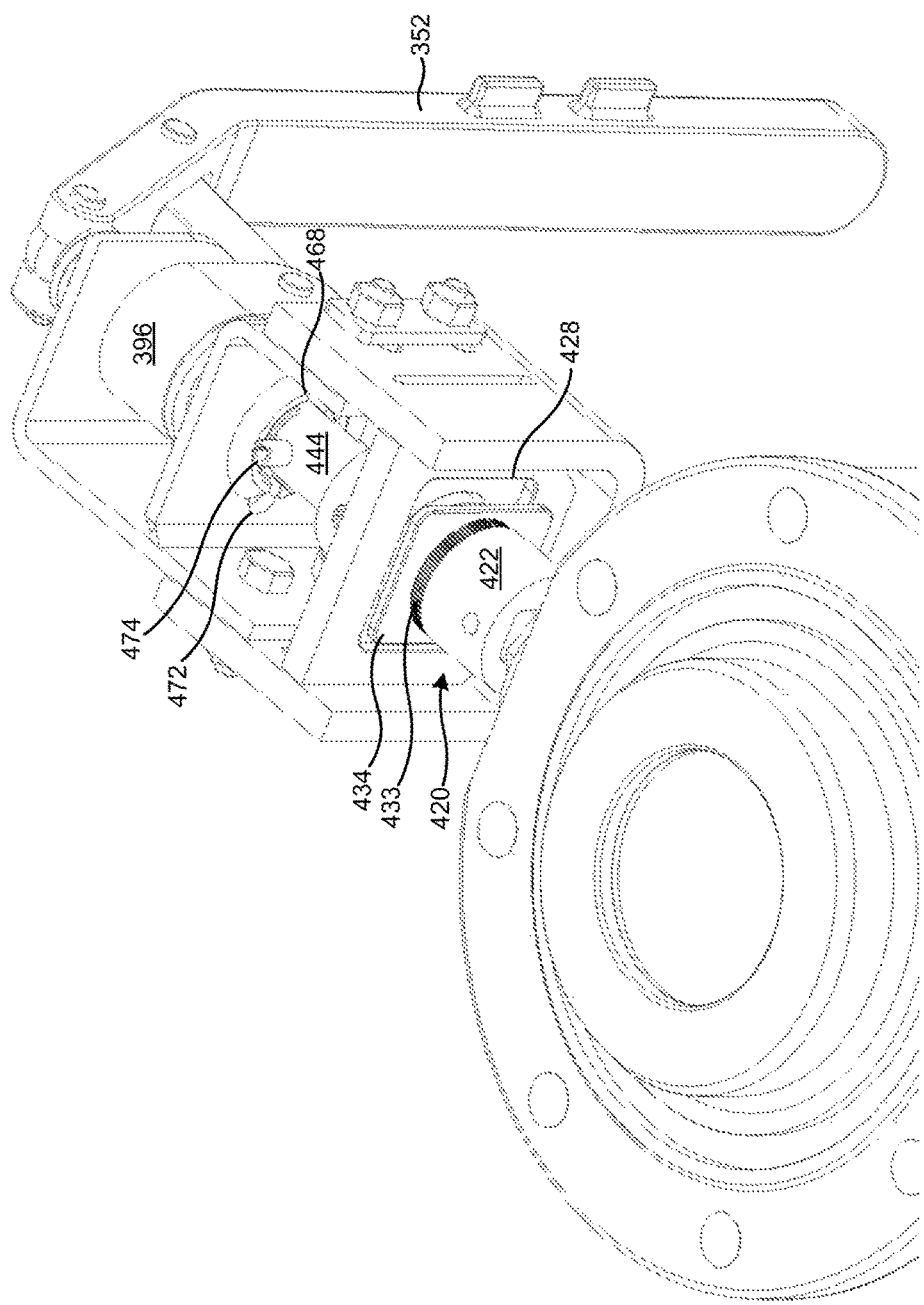

A bushing 448 (FIGS. 16 and 19B), which is preferably constructed of bronze, is secured within the tubular shaft guide 392, preferably in a press fit or interference fit fashion (FIG. 19B). The bushing has opposing slots (one of which is visible at 450 in FIG. 16), which align with the channels 398 of the tube.

With reference to FIGS. 16 and 19A, the shaft 444 passes through the bushing 448, and thus through the tubular shaft guide 392, as well as through a compression coil spring 452. The distal end of the shaft 444 feature an opening 454 to which the handle 352 is pivotally attached via pin 456.

Continuing with FIGS. 16 and 19A, a four-bar linkage is built into the handle to engage and disengage the handle from the BOV. More specifically, the proximal portion of the handle 352, the distal portion of the shaft 444, a link 458 and a U-shaped linkage bracket 462 form the four-bar linkage.

The link 458 is pivotally attached by one end to the handle 352 via pin 464 and to the U-shaped linkage bracket by pin 466. The U-shaped linkage bracket 462 is positioned on, but free to pivot with respect to, the outer portion 396 of the tubular guide shaft.

Shaft 444 pivots within and slides horizontally through the tubular shaft guide 392. A pair of keyway openings 468 and 472 (FIG. 16) are formed in inner wall 388 of the shaft support bracket 350 and communicate with the opposing pair of opposing slots 398 of the tubular shaft guide. A pin 474 passes through the shaft 444 in a fixed fashion. The interaction of the pin 474 of the shaft and the keyway openings 368 and 472 and the opposing slots of the tubular guide shaft will be explained below.

As shown in FIG. 19A, the compression coil spring 452 is engaged at one end by the proximal end of handle 352 and at the other end by the outer surface of outer wall 386 of the shaft support bracket 350. As a result, the coil spring 452 urges the handle and shaft into the disengaged position illustrated in FIGS. 14, 19A and 20A.

Use of the disengaging handle assembly to open and close the BOV 332 will now be explained with regard to FIGS. 19A-20C.

Figure 20A:
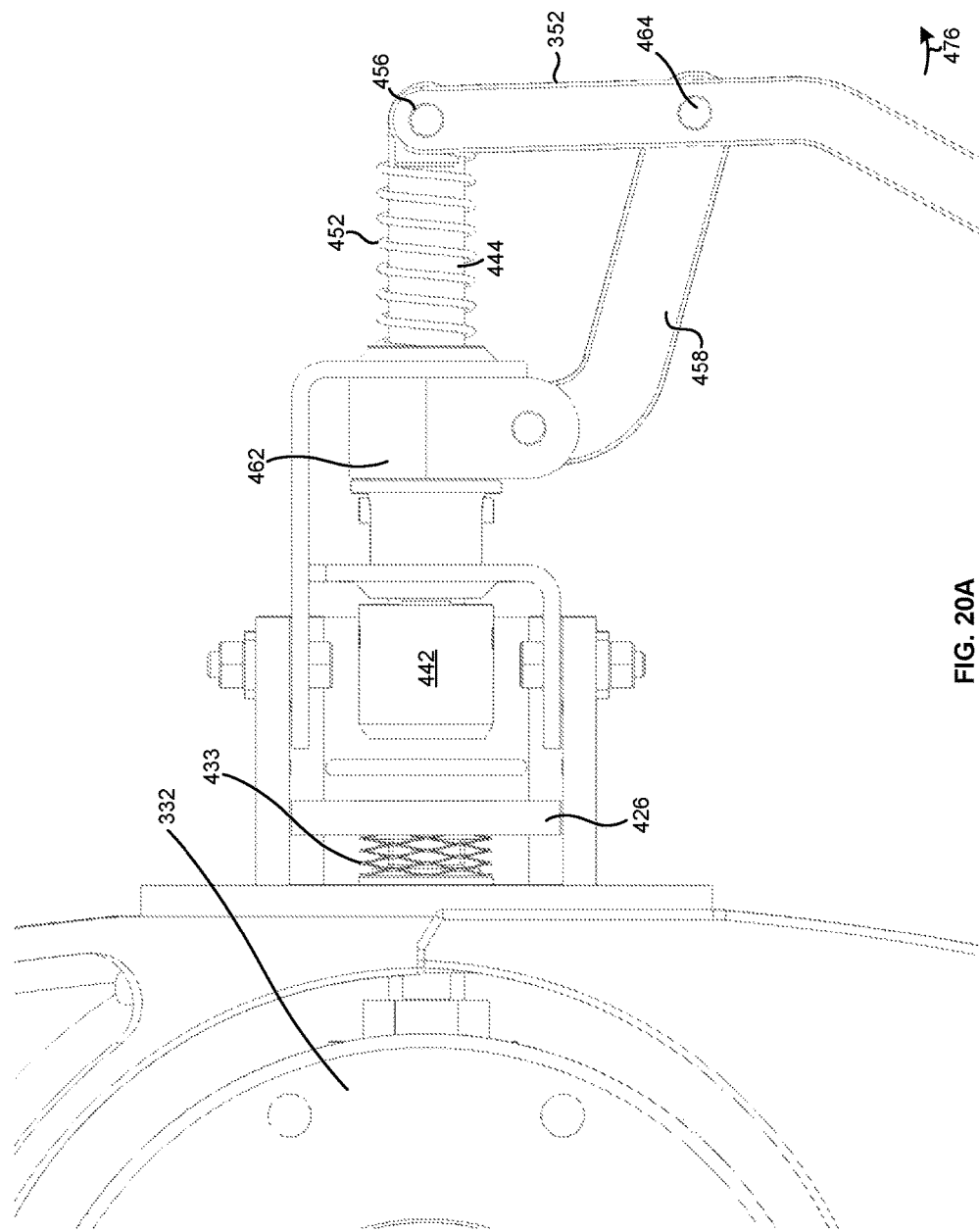
FIGS. 20A-20C are top plan views of the disengaging handle assembly of FIG. 14 with the top plate omitted for clarity and illustrating the disengaging handle assembly in the disengaged, engaged (with BOV closed) and engaged (with BOV open) configurations, respectively.

Starting with the disengaging handle assembly in the disengaged configuration or position of FIGS. 19A and 20A, where the BOV 332 is in the closed condition, the operator pulls on the handle 352, in the direction of arrow 476 of FIGS. 19A and 20A. This causes the shaft to slide towards the BOV so that the adapter 442 is moved towards the divider wall 426.

As illustrated in FIGS. 16 and 19A, the window 428 of the divider wall 426 features a rectangular opening on the side facing the BOV (FIG. 19A) and a smaller round opening (FIG. 16) on the opposite side. As illustrated in FIGS. 19A and 20A, when the BOV is in the closed condition and the disengaging handle assembly has not been actuated, the rectangular stop plate 434 of the stem coupler assembly 420 is seated within the rectangular opening of the window 428 due to the urging of wave spring 433.

As the user continues to pull the handle (arrow 476 in FIGS. 19A and 20A), and the shaft moves into the engaged position, the nose of the adapter 442 passes through the circular opening of the window 428 of the divider wall and engages the stop plate 434 of the stem coupler assembly 420 (as the recess in the nose engages the rectangular male portion, 432 in FIGS. 16 and 17, of the stem coupler assembly). As the user continues to pull the handle still further, the nose of the adapter 442 pushes the stop plate 434 towards the BOV, which causes the stop plate to disengage from the rectangular opening of the window 428 of the divider wall 426 and move into the position illustrated in FIGS. 19B and 20B, against the urging of the wave spring 433.

With reference to FIG. 19A, as the shaft, and thus handle pin 456, move towards the BOV, the handle 352 pivots about the handle pin 464 so that a fulcrum is provided via link 458 so as to facilitate the actuation.

As the handle 352 is moved between the positions illustrated in 19A and 19B, the ends of the pin 474 of the shaft 444 exit the opposing slots 398 (FIG. 16) of the tubular shaft guide 392 and, as illustrated in FIG. 19B, travel towards the BOV through the pair of keyway openings 468 and 472 of inner wall 388 of the shaft support bracket.

Figure 20B:
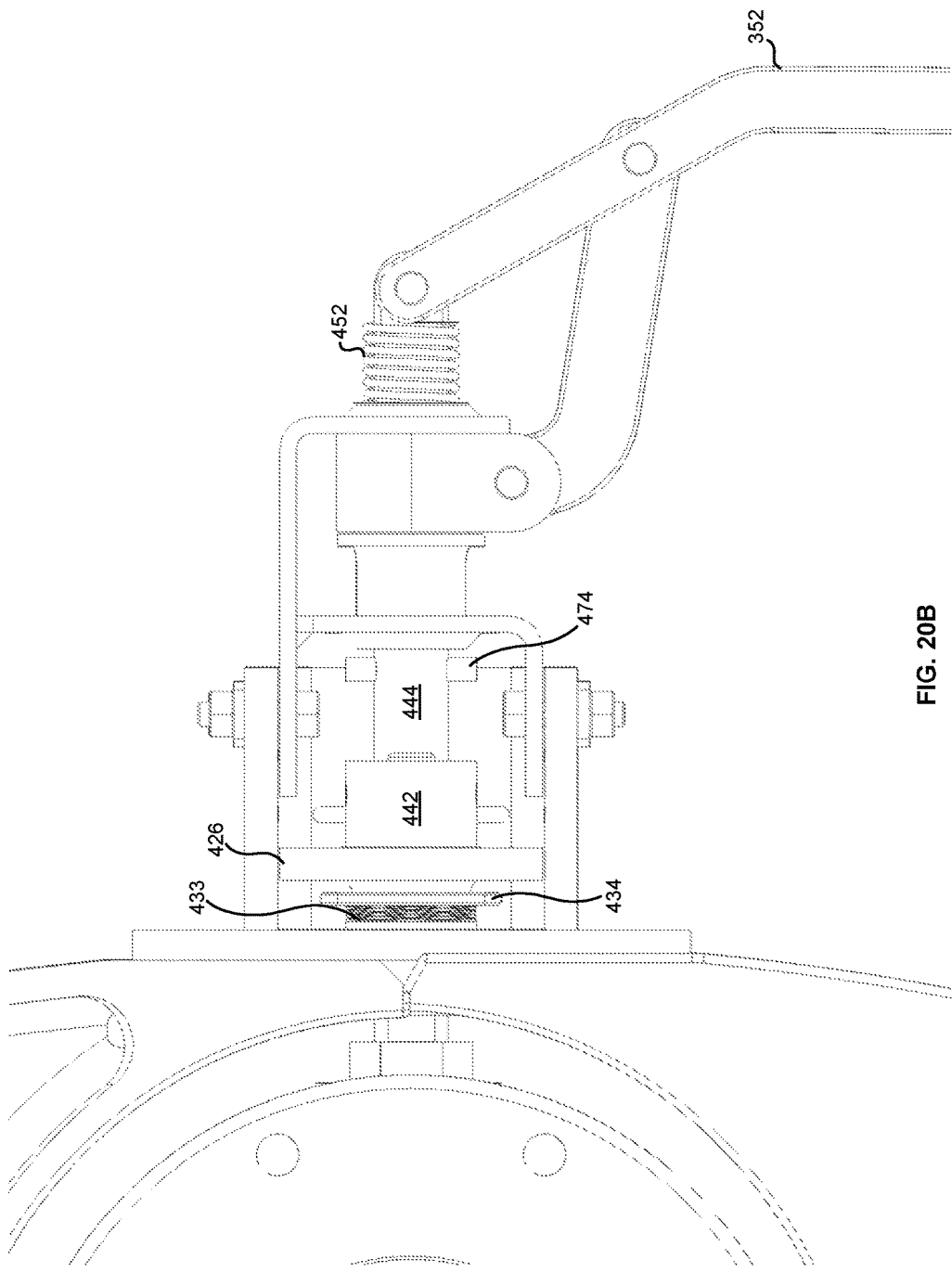
Figure 20C:
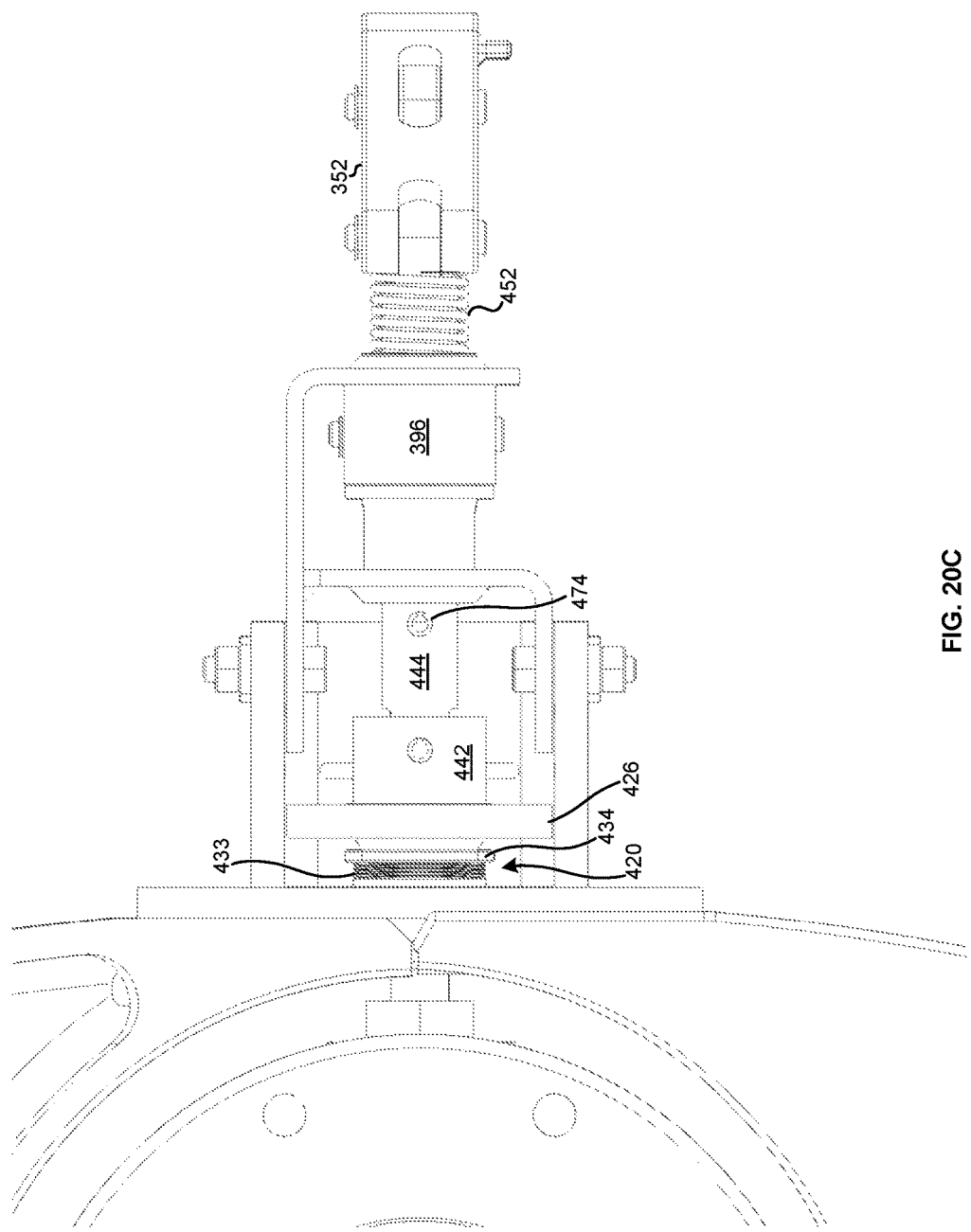

As a result, the disengaging handle assembly is in the engaged configuration illustrated in FIGS. 19B and 20B.

The BOV is still closed at this time, but the handle 352 is now free to be rotated about the longitudinal axis of the shaft 444 (480 in FIG. 16).

To open the BOV, the operator next turns the handle generally 90° downwards, i.e., in the direction illustrated by arrow 482 in FIG. 19B. This causes the shaft 444 to rotate so that the adapter 442, stem coupler assembly 420 and the BOV stem (416 in FIG. 16) also rotate and the BOV is opened.

As the handle is rotated from the position of 19B and 20B to the position illustrated in 19C and 20C, the stop plate 434 rotates so that it is oriented 90° with respect to the rectangular opening of the window 428 of the divider wall. Furthermore, the pins 474 are 90° out of alignment with regard to the keyway openings 368 and 472. As a result, the shaft 444 cannot be slid away from the BOV. This ensures that the nose of the adapter 442 cannot be disengaged from the stem coupler assembly 420 unless the BOV is closed, thus preventing the operator from accidentally leaving the BOV open during train movement.

The compression spring 452 pushes the handle 352 and shaft 444 back to their default, disengaged positions of FIGS. 19A and 20A when the handle 352 is pivoted back into the position of FIGS. 19B and 20B (whereby the BOV is closed) and the released.

While various embodiments of the invention have been shown and described, it will be apparent to those skilled in the art that changes and modifications may be made therein without departing from the scope of the invention. It is therefore intended that the foregoing detailed description be regarded as illustrative rather than limiting. It should be understood that the following claims, including all equivalents, are intended to define the scope of the invention.

What is claimed is:

1. A handle assembly for an outlet valve for a tank, where the outlet valve has a stem that is actuated to open and close the outlet valve, the handle assembly comprising:
   a. a handle;
   b. a shaft attached to the handle;
   c. an adapter attached to the shaft; and
   d. a bracket adapted to mount the shaft to the tank so that the shaft is pivotally mounted with respect to the tank and movable with respect to the outlet valve between an engaged position where the adapter is connected to the stem and a disengaged position where the adapter is disconnected from the stem;
   e. a housing having a divider wall with a divider wall opening, said housing adapted to be mounted between the outlet valve and the bracket;
   f. a coupler assembly comprising:
      i) a socket portion adapted to be mounted on the stem of the outlet valve;
      ii) a male portion connected to the socket portion and having an end configured to be engaged by the adapter;
      iii) a stop plate having a stop plate opening that receives the male portion in a sliding fashion, said stop plate sized and shaped to selectively engage the divider wall opening;
      iv) a spring positioned between the stop plate and the socket portion, said spring urging the stop plate towards engagement with the divider wall opening;
      v) said adapter engaging the end of the male portion of the coupler assembly and moving said stop plate clear of the divider wall opening as the shaft moves into the engaged position so that the handle is free to pivot about the longitudinal axis of the shaft.

2. The handle assembly of claim 1 wherein the bracket includes a tubular shaft guide which receives the shaft so that the shaft slides in a direction parallel to a longitudinal axis of the shaft between the engaged and disengaged positions.

3. The handle assembly of claim 2 wherein the bracket includes an inner wall and an outer wall with the tubular shaft guide positioned there between.

4. The handle assembly of claim 3 further comprising a spring positioned between the handle and the outer wall of the bracket so that the shaft is urged towards the disengaged position.

5. The handle assembly of claim 2 wherein the handle is pivotally attached to the distal end of the shaft and further comprising a linkage bracket pivotally mounted to the tubular shaft guide and a link having a first end pivotally attached to the linkage bracket and a second end pivotally attached to the handle so the link provides a fulcrum when the handle is pivoted about the distal end of the shaft.

6. The handle assembly of claim 2 further comprising a bushing secured within the tubular shaft guide, said bushing receiving the shaft so that the shaft slides in a direction parallel to a longitudinal axis of the shaft between the engaged and disengaged positions.

7. The handle assembly of claim 2 wherein the tubular shaft guide includes a slot and further comprising a pin attached to the shaft, said pin traversing the slot of the shaft guide as the shaft is moved between the engaged and disengaged positions with said pin being clear of the slot when the shaft is in the engaged position so that the handle is free to pivot about the longitudinal axis of the shaft.

8. The handle assembly of claim 1 further comprising a latch bracket adapted to be attached to the tank, said latch bracket including a latch support tab adapted to engage a distal end portion of the handle when the shaft is in the disengaged position.

9. The handle assembly of claim 8 wherein said latch support tab includes a latch opening and further comprising a latching member adapted to engage the distal portion of the handle and the latch opening when the shaft is in the disengaged position.

10. A vehicle comprising:
　a. a tank;
　b. an outlet valve positioned on the tank, said outlet valve including a stem that rotates between an open position that corresponds to an open configuration of the outlet valve and a closed position that corresponds to a closed configuration of the outlet valve;
　c. a handle assembly including:
　　i) a handle;
　　ii) a shaft attached to the handle;
　　iii) an adapter attached to the shaft;
　　iv) a bracket mounted to the tank and to which the shaft is pivotally mounted;
　　v) said shaft movable between an engaged position where the adapter is connected to the stem and a disengaged position where the adapter is disconnected from the stem;
　d. a housing having a divider wall with a divider wall opening, said housing mounted between the outlet valve and the bracket;
　e. a coupler assembly comprising:
　　i) a socket portion mounted on the stem of the outlet valve;
　　ii) a male portion connected to the socket portion and having an end configured to be engaged by the adapter;
　　iii) a stop plate having a stop plate opening that receives the male portion in a sliding fashion, said stop plate sized and shaped to selectively engage the divider wall opening;
　　iv) a spring positioned between the stop plate and the socket portion, said spring urging the stop plate towards engagement with the divider wall opening;
　　v) said adapter engaging the end of the male portion of the coupler assembly and moving said stop plate clear of the divider wall opening as the shaft moves into the engaged position so that the handle is free to pivot about the longitudinal axis of the shaft.

11. The vehicle of claim 10 wherein the bracket includes a tubular shaft guide which receives the shaft so that the shaft slides in a direction parallel to a longitudinal axis of the shaft between the engaged and disengaged positions.

12. The vehicle of claim 11 wherein the bracket includes an inner wall and an outer wall with the tubular shaft guide positioned there between.

13. The vehicle of claim 12 further comprising a spring positioned between the handle and the outer wall of the bracket so that the shaft is urged towards the disengaged position.

14. The vehicle of claim 11 wherein the handle is pivotally attached to the distal end of the shaft and further comprising a linkage bracket pivotally mounted to the tubular shaft guide and a link having a first end pivotally attached to the linkage bracket and a second end pivotally attached to the handle so the link provides a fulcrum when the handle is pivoted about the distal end of the shaft.

15. The vehicle of claim 11 further comprising a bushing secured within the tubular shaft guide, said bushing receiving the shaft so that the shaft slides in a direction parallel to a longitudinal axis of the shaft between the engaged and disengaged positions.

16. The vehicle of claim 11 wherein the tubular shaft guide includes a slot and further comprising a pin attached to the shaft, said pin traversing the slot of the shaft guide as the shaft is moved between the engaged and disengaged positions with said pin being clear of the slot when the shaft is in the engaged position so that the handle is free to pivot about the longitudinal axis of the shaft.

17. The vehicle of claim 10 further comprising a latch bracket attached to the tank, said latch bracket including a latch support tab adapted to engage a distal end portion of the handle when the shaft is in the disengaged position.

18. The vehicle of claim 17 wherein said latch support tab includes a latch opening and further comprising a latching member adapted to engage the distal portion of the handle and the latch opening when the shaft is in the disengaged position.

* * * * *

UNITED STATES PATENT AND TRADEMARK OFFICE
CERTIFICATE OF CORRECTION

PATENT NO. : 9,828,006 B2  
APPLICATION NO. : 14/949486  
DATED : November 28, 2017  
INVENTOR(S) : Thompson et al.

Page 1 of 1

It is certified that error appears in the above-identified patent and that said Letters Patent is hereby corrected as shown below:

On the Title Page

Item (72) should read:  
(72) Inventors: Nickolas Thompson, Chicago, IL (US);  
           Gary Walter, Chicago, IL (US);  
           Robert S. Toms, Chicago, IL (US)

Signed and Sealed this  
First Day of January, 2019

Andrei Iancu  
*Director of the United States Patent and Trademark Office*